US010241837B2

(12) United States Patent
Huang et al.

(10) Patent No.: US 10,241,837 B2
(45) Date of Patent: Mar. 26, 2019

(54) SYSTEMS AND METHODS FOR DATA MANAGEMENT

(71) Applicant: Beijing Horizon Information Technology Co., Ltd., Beijing (CN)

(72) Inventors: Chang Huang, San Jose, CA (US); Liang Chen, Beijing (CN); Kun Ling, Beijing (CN); Feng Zhou, San Jose, CA (US)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/888,380

(22) Filed: Feb. 5, 2018

(65) Prior Publication Data

US 2018/0173571 A1 Jun. 21, 2018

Related U.S. Application Data

(63) Continuation of application No. PCT/CN2017/115213, filed on Dec. 8, 2017, which is
(Continued)

(51) Int. Cl.
*G06F 9/50* (2006.01)
*G06K 9/00* (2006.01)
(Continued)

(52) U.S. Cl.
CPC ........ *G06F 9/5044* (2013.01); *G06F 13/1678* (2013.01); *G06K 9/00979* (2013.01);
(Continued)

(58) Field of Classification Search
CPC .................................................... G06N 3/063
See application file for complete search history.

(56) References Cited

U.S. PATENT DOCUMENTS

| 5,087,826 A | 2/1992 | Holler et al. |
| 6,539,368 B1 | 3/2003 | Chernikov et al. |

(Continued)

FOREIGN PATENT DOCUMENTS

| CN | 102497567 A | 6/2012 |
| CN | 103310228 A | 9/2013 |

(Continued)

OTHER PUBLICATIONS

Sankaradas, Murugan et al.; a Massively Parallel Coprocessor for Convolutional Neural Networks; 2009 20th IEEE International Conference on Application-specific Systems, Architectures and Processors; pp. 53-60. (Year: 2009).*

(Continued)

*Primary Examiner* — Stanley K. Hill
(74) *Attorney, Agent, or Firm* — Wilson Sonsini Goodrich & Rosati

(57) ABSTRACT

A method for data management is provided. The method comprises: storing the plurality of items in a contiguous space within the memory, executing an instruction containing an address and a size that together identify the contiguous space to transmit the plurality of items from the main memory to a random-access memory (RAM) on a chip, and the chip includes a computing unit comprising a plurality of multipliers; and instructing the computing unit on the chip to: retrieve multiple of the plurality of items from the RAM; and perform a plurality of parallel operations using the plurality of multipliers with the multiple items to yield output data.

12 Claims, 16 Drawing Sheets

Related U.S. Application Data a continuation-in-part of application No. PCT/CN2016/109258, filed on Dec. 9, 2016, and a continuation-in-part of application No. PCT/CN2016/109257, filed on Dec. 9, 2016, and a continuation-in-part of application No. PCT/CN2017/100201, filed on Sep. 1, 2017.

(51) Int. Cl.
  *G06F 13/16* (2006.01)
  *G06N 3/06* (2006.01)
  *G06N 3/02* (2006.01)

(52) U.S. Cl.
  CPC ............... *G06N 3/06* (2013.01); *G06N 3/02* (2013.01); *Y02D 10/14* (2018.01)

(56) References Cited

U.S. PATENT DOCUMENTS

2015/0170021 A1  6/2015  Lupon et al.
2017/0357894 A1* 12/2017  Bainville ............ G06N 3/0454

FOREIGN PATENT DOCUMENTS

| CN | 103761213 A | 4/2014 |
|---|---|---|
| CN | 104935831 A | 9/2015 |
| CN | 105488565 A | 4/2016 |
| CN | 105512723 A | 4/2016 |
| CN | 108108811 A | 6/2018 |
| WO | WO-2018103736 A1 | 6/2018 |

OTHER PUBLICATIONS

Chen, Tianshi et al.; A Small-Footprint Accelerator for Large-Scale Neural Networks; 2015 ACM Transactions on Computer Systems, vol. 33, No. 2, Article 6; 27 pages. (Year: 2015).*

Luo, Tao et al.; DaDianNao: A Neural Network Supercomputer; 2017 IEEE Transactions on Computers, vol. 66, No. 1; pp. 73-88. (Year: 2017).*

Ohba, Momoka et al.; Initial Study of Reconfigurable Neural Network Accelterators; 2016 Fourth International Symposium on Computing and Networking; pp. 707-709. (Year: 2016).*

Peemen, Maurice et al.; Memory-Centric Accelerator Design for Convolutional Neural Networks; Proceedings of the 2013 31th International Conference on Computer Design (ICCD); 8 pages. (Year: 2013).*

Pham, Phi-Hung et al.; Neuflow: Dataflow Vision Processing System-on-a-Chip; 2012 IEEE; pp. 1044-1047. (Year: 2012).*

Zhang, Chen et al.; Optimizing FPGA-based Accelerator Design for Deep Convolutional Neural Networks; 2015 ACM FPGA; pp. 161-170. (Year: 2015).*

Chen, et al. Eyeriss: A Spatial Architecture for Energy-Efficient Dataflow for Convolutional Neural Networks. 2016 ACM/IEEE 43rd Annual International Symposium on Computer Architecture (ISCA), Seoul, 2016, pp. 367-379.

Chi, et al. PRIME: A Novel Processing-in-memory Architecture for Neural Network Computation in ReRAM-based Main Memory. 2016 ACM/IEEE 43rd Annual International Symposium on Computer Architecture (ISCA), Seoul, 2016, pp. 27-39.

Han, et al. EIE: Efficient Inference Engine on Compressed Deep Neural Network. eprint arXiv:1602.01528. Feb. 2016.

Liu, et al. Cambricon: an Instruction Set Architecture for Neural Networks. 2016 ACM/IEEE 43rd Annual International Symposium on Computer Architecture (ISCA), Seoul, 2016, pp. 393-405.

Abadi, Martín, et al. TensorFlow. "Large-scale machine learning on heterogeneous distributed systems." Proceedings of the 12th USENIX Symposium on Operating Systems Design and Implementation (OSDI'16)(Savannah, GA, USA. 2016.

Chen, Tianqi, et al. "Mxnet: A flexible and efficient machine learning library for heterogeneous distributed systems." arXiv preprint arXiv:1512.01274 (2015).

Du, Zidong, et al. "ShiDianNao: Shifting vision processing closer to the sensor." ACM SIGARCH Computer Architecture News. vol. 43. No. 3. ACM, 2015.

Jia, Yangqing, et al. "Caffe: Convolutional architecture for fast feature embedding." Proceedings of the 22nd ACM international conference on Multimedia. ACM, 2014.

Jouppi, Norman P., et al. "In-datacenter performance analysis of a tensor processing unit." Computer Architecture (ISCA), 2017 ACM/IEEE 44th Annual International Symposium on. IEEE, 2017.

Howard, Andrew G., et al. "Mobilenets: Efficient convolutional neural networks for mobile vision applications." arXiv preprint arXiv:1704.04861 (2017).

International search report with written opinion dated Mar. 8, 2018 for PCT/CN2017/115213.

* cited by examiner

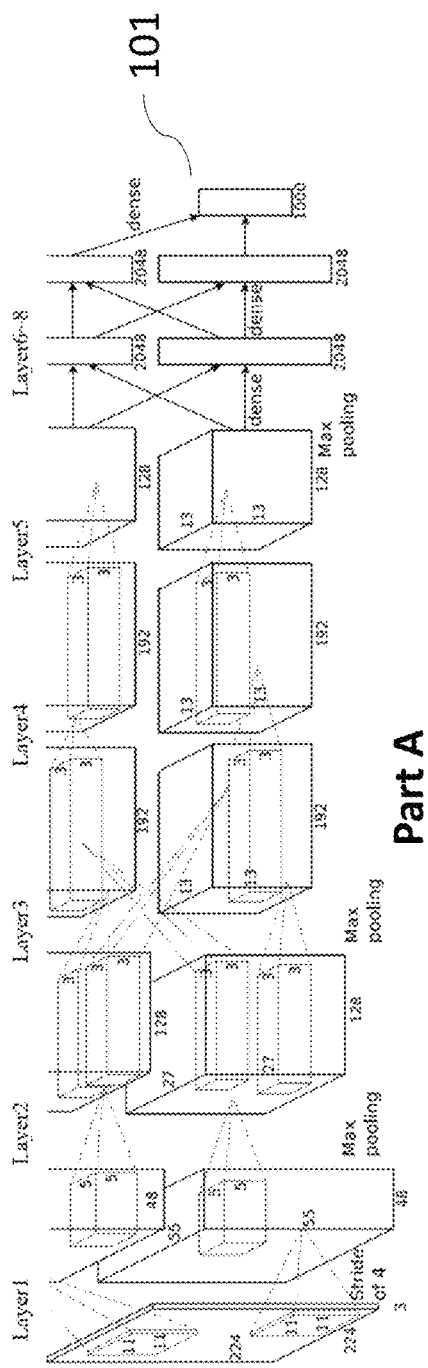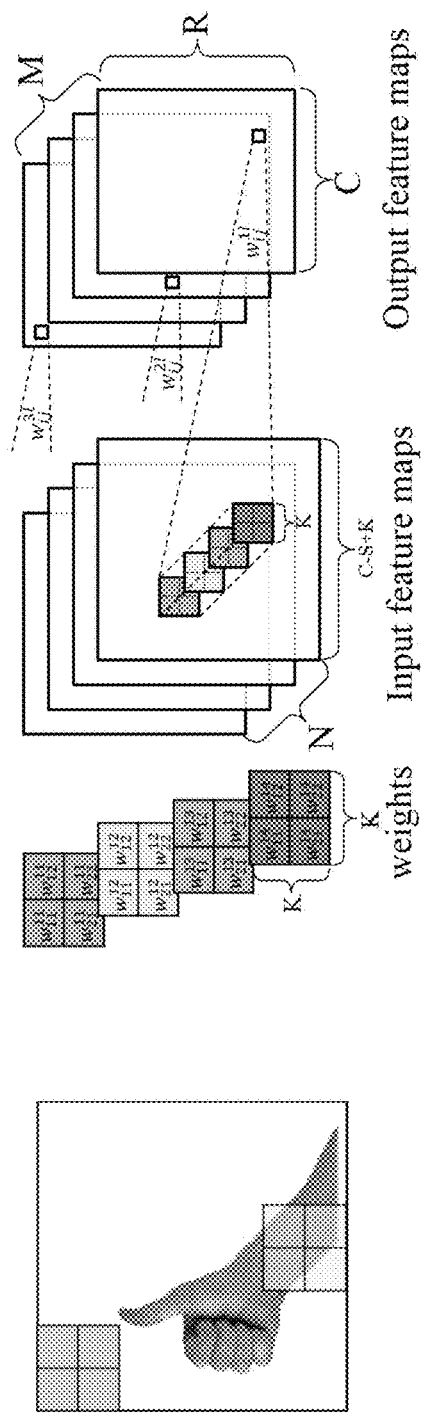
FIG. 1

FIG. 6

Parameters data arranged in slices in main memory

| $Ps_1$ | $Ps_2$ | $Ps_3$ | $Ps_4$ | $Ps_5$ | $Ps_6$ | $Ps_7$ | $Ps_8$ | |
|---|---|---|---|---|---|---|---|---|
| K0R0S0C0 | K0R0S0C4 | K1R0S0C0 | K1R0S0C4 | K2R0S0C0 | K2R0S0C4 | K3R0S0C0 | K3R0S0C4 | KjR0S0Ci |
| K0R0S0C1 | K0R0S0C5 | K1R0S0C1 | K1R0S0C5 | K2R0S0C1 | K2R0S0C5 | K3R0S0C1 | K3R0S0C5 | |
| K0R0S0C2 | K0R0S0C6 | K1R0S0C2 | K1R0S0C6 | K2R0S0C2 | K2R0S0C6 | K3R0S0C2 | K3R0S0C6 | |
| K0R0S0C3 | K0R0S0C7 | K1R0S0C3 | K1R0S0C7 | K2R0S0C3 | K2R0S0C7 | K3R0S0C3 | K3R0S0C7 | |
| K0R0S1C0 | K0R0S1C4 | K1R0S1C0 | K1R0S1C4 | K2R0S1C0 | K2R0S1C4 | K3R0S1C0 | K3R0S1C4 | KjR0S1Ci |
| K0R0S1C1 | K0R0S1C5 | K1R0S1C1 | K1R0S1C5 | K2R0S1C1 | K2R0S1C5 | K3R0S1C1 | K3R0S1C5 | |
| K0R0S1C2 | K0R0S1C6 | K1R0S1C2 | K1R0S1C6 | K2R0S1C2 | K2R0S1C6 | K3R0S1C2 | K3R0S1C6 | |
| K0R0S1C3 | K0R0S1C7 | K1R0S1C3 | K1R0S1C7 | K2R0S1C3 | K2R0S1C7 | K3R0S1C3 | K3R0S1C7 | |
| K0R1S0C0 | K0R1S0C4 | K1R1S0C0 | K1R1S0C4 | K2R1S0C0 | K2R1S0C4 | K3R1S0C0 | K3R1S0C4 | KjR1S0Ci |
| K0R1S0C1 | K0R1S0C5 | K1R1S0C1 | K1R1S0C5 | K2R1S0C1 | K2R1S0C5 | K3R1S0C1 | K3R1S0C5 | |
| K0R1S0C2 | K0R1S0C6 | K1R1S0C2 | K1R1S0C6 | K2R1S0C2 | K2R1S0C6 | K3R1S0C2 | K3R1S0C6 | |
| K0R1S0C3 | K0R1S0C7 | K1R1S0C3 | K1R1S0C7 | K2R1S0C3 | K2R1S0C7 | K3R1S0C3 | K3R1S0C7 | |
| K0R1S1C0 | K0R1S1C4 | K1R1S1C0 | K1R1S1C4 | K2R1S1C0 | K2R1S1C4 | K3R1S1C0 | K3R1S1C4 | KjR1S1Ci |
| K0R1S1C1 | K0R1S1C5 | K1R1S1C1 | K1R1S1C5 | K2R1S1C1 | K2R1S1C5 | K3R1S1C1 | K3R1S1C5 | |
| K0R1S1C2 | K0R1S1C6 | K1R1S1C2 | K1R1S1C6 | K2R1S1C2 | K2R1S1C6 | K3R1S1C2 | K3R1S1C6 | |
| K0R1S1C3 | K0R1S1C7 | K1R1S1C3 | K1R1S1C7 | K2R1S1C3 | K2R1S1C7 | K3R1S1C3 | K3R1S1C7 | |

Parameters for 4 filter 2x2 8 channel

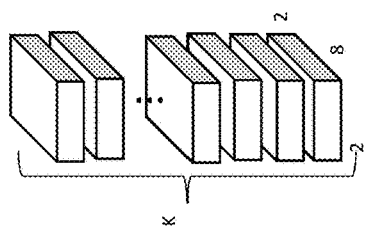

Input data arranged in slices in main memory

| Is₁ | Is₂ | Is₃ | Is₄ | Is₅ | Is₆ | Is₇ | Is₈ |
|---|---|---|---|---|---|---|---|
| H0W0C0 | H0W0C4 | H0W1C0 | H0W1C4 | H0W2C0 | H0W2C4 | H0W3C0 | H0W3C4 |
| H0W0C1 | H0W0C5 | H0W1C1 | H0W1C5 | H0W2C1 | H0W2C5 | H0W3C1 | H0W3C5 |
| H0W0C2 | H0W0C6 | H0W1C2 | H0W1C6 | H0W2C2 | H0W2C6 | H0W3C2 | H0W3C6 |
| H0W0C3 | H0W0C7 | H0W1C3 | H0W1C7 | H0W2C3 | H0W2C7 | H0W3C3 | H0W3C7 |
| H1W0C0 | H1W0C4 | H1W1C0 | H1W1C4 | H1W2C0 | H1W2C4 | H1W3C0 | H1W3C4 |
| H1W0C1 | H1W0C5 | H1W1C1 | H1W1C5 | H1W2C1 | H1W2C5 | H1W3C1 | H1W3C5 |
| H1W0C2 | H1W0C6 | H1W1C2 | H1W1C6 | H1W2C2 | H1W2C6 | H1W3C2 | H1W3C6 |
| H1W0C3 | H1W0C7 | H1W1C3 | H1W1C7 | H1W2C3 | H1W2C7 | H1W3C3 | H1W3C7 |
| H2W0C0 | H2W0C4 | H2W1C0 | H2W1C4 | H2W2C0 | H2W2C4 | H2W3C0 | H2W3C4 |
| H2W0C1 | H2W0C5 | H2W1C1 | H2W1C5 | H2W2C1 | H2W2C5 | H2W3C1 | H2W3C5 |
| H2W0C2 | H2W0C6 | H2W1C2 | H2W1C6 | H2W2C2 | H2W2C6 | H2W3C2 | H2W3C6 |
| H2W0C3 | H2W0C7 | H2W1C3 | H2W1C7 | H2W2C3 | H2W2C7 | H2W3C3 | H2W3C7 |
| H3W0C0 | H3W0C4 | H3W1C0 | H3W1C4 | H3W2C0 | H3W2C4 | H3W3C0 | H3W3C4 |
| H3W0C1 | H3W0C5 | H3W1C1 | H3W1C5 | H3W2C1 | H3W2C5 | H3W3C1 | H3W3C5 |
| H3W0C2 | H3W0C6 | H3W1C2 | H3W1C6 | H3W2C2 | H3W2C6 | H3W3C2 | H3W3C6 |
| H3W0C3 | H3W0C7 | H3W1C3 | H3W1C7 | H3W2C3 | H3W2C7 | H3W3C3 | H3W3C7 |

4x4 input data with 8 channels

SYSTEMS AND METHODS FOR DATA MANAGEMENT

CROSS-REFERENCE TO RELATED APPLICATIONS

This application is a continuation application of International Patent Application PCT/CN2017/115213 filed on Dec. 8, 2017, which is a continuation-in-part of PCT Application No. PCT/CN2016/109258 filed on Dec. 9, 2016, PCT/CN2016/109257 filed on Dec. 9, 2016, and PCT/CN2017/100201 filed on Sep. 1, 2017, each of which the entire contents is incorporated herein by reference.

BACKGROUND OF THE INVENTION

Deep computing frameworks, such as Convolutional Neural Networks (CNNs), have been used in many application areas, including pattern recognition, signal processing, time series analysis, and the like. CNNs require large amounts of computation involving a usually large number of parameters both during training and when the fully-trained network are deployed in the field. CNNs are deployed in mobile and embedded systems that interact with the real world. However, efficiency of CNNs that require such large amounts of computation and data may be limited by the power (e.g., battery), memory access bandwidth, and communication cost.

General-purpose processors may be programmable to perform complex calculations. However such processors may consume more power and perform operations at a lower speed. Graphical computing unit (GPU) may be configured to run faster than general-purpose processors; however, higher power consumption may be required. It would be helpful to have a method and system that satisfy the requirements for reduced latency and low power consumption.

SUMMARY OF THE INVENTION

Systems and methods are provided for data management so as to reduce memory accessing times and improve efficiency of computation. The computation and memory access pattern associated with CCNs are generally conducive to an optimized chip design. Therefore, the systems and methods can include implementing application of a CNN on a single chip. The data management may include arranging a plurality of items such as neural network parameters and input feature map in storage with respect to regions and slices and reducing amount of traffic between a main memory and such a chip having a RAM and a computing unit capable of performing parallel operations. According to one aspect of the present invention, a system for data management is provided. In practice, the method comprises: storing the plurality of items in a contiguous space within the memory, executing an instruction containing an address and a size that together identify the contiguous space to transmit the plurality of items from the main memory to a random-access memory (RAM) on a chip, and the chip includes a computing unit comprising a plurality of multipliers; and instructing the computing unit on the chip to: retrieve multiple of the plurality of items from the RAM; and perform a plurality of parallel operations using the plurality of multipliers with the multiple items to yield output data.

In some embodiments, the method further comprises determining the address in the main memory and the size before storing the plurality of items into the contiguous space. In some embodiments, the method further comprises issuing an instruction that allows the computing unit to obtain information regarding how the plurality of items are arranged in the contiguous space In some cases, the method further comprises receiving information regarding a neural network wherein the plurality of groups correspond to a plurality of layers of the neural network and the plurality of items include parameters of the neural network, and where the plurality of parallel operations correspond to multiplications associated with one of the plurality of layers. In some cases, the information regarding the neural network includes, for one of the plurality of layers, a combination of a number of filters, a number of channels, and a filter size. In some cases, the method may further comprise: for the one layer, determining a number of slices based on the number of channels, that the contiguous space is divided into a plurality of regions, each region being contiguous; and dividing an area within one of the plurality of regions into at least the number of slices, each slice being contiguous, that the storing includes arranging items classified into one of the plurality of groups across the number of slices such that all items stored at the same offset from starting points of the number of slices are used for the parallel operations. In some cases, the method may further comprise: for the one layer, determining a number of slices based on the filter size, that the contiguous space is divided into a plurality of regions, each region being contiguous; and dividing an area within one of the plurality of regions into at least the number of slices, each slice being contiguous, that the storing includes arranging the items across the number of slices such that all items stored at the same offset from starting points of the number of slices are used for the parallel operations.

In some embodiments, the contiguous space in the main memory for storing the data is divided into a plurality of regions, each region being contiguous, and that the storing further comprises arranging items classified into multiple of the plurality of groups in the same region to reduce unused space in the contiguous space. In some cases, the method further comprises dividing an area within one of the plurality of regions into a plurality of slices, each slice being contiguous, the area is allocated to the items classified into the one group, the storing further comprises arranging the items classified into the one group across the plurality of slices, and the instructing includes performing multiple of the plurality of parallel operations using multiple items stored at the same offset from starting points of the plurality of slices. In some embodiments, a second contiguous space in the RAM having the substantially same size as the contiguous space in the main memory is divided into regions and slices in the same manner as the contiguous space, and the plurality of items are arranged in the second contiguous space in substantially the same manner as in the contiguous space, further comprising issuing an instruction that allows the computing to obtain information regarding, for one of the plurality of groups, a starting point of an area in the second contiguous space where items classified into the one group are stored and a starting point of each of a plurality of slices in the area.

In another aspect of the invention, a system for arranging data to accelerate deep computing is provided. The system comprises: one or more processors; and one or more memories having instructions stored thereon which when executed by the one or more processors cause the one or more processors to perform: storing the plurality of items in a contiguous space within a main memory, issuing an instruction to transmit the plurality of items from the main memory to a random-access memory (RAM) on a chip, wherein the instruction contains an address and a size that together identify the contiguous space, and wherein the chip includes a computing unit comprising a plurality of multipliers; and instructing the computing unit on the chip to: retrieve multiple of the plurality of items from the RAM; and perform a plurality of parallel operations using the plurality of multipliers with the multiple items to yield output data.

In another aspect, a data management method is provided. The method comprises: receiving, with aid of one or more processors, data regarding a plurality of objects, each containing a group of three-dimensional numerical arrays; allocating a space in a main memory to the plurality of objects, wherein the space includes a plurality of regions; assigning an area within one of the plurality of regions to one of the plurality of objects; determining a number of slices for the one object based on a size of the group and dimensions of the three-dimensional numerical arrays contained in the one object; dividing the area into at least the number of slices for the one object; and storing numerical items in the three-dimensional arrays contained in the one object across the number of slices such that at least one numerical item is stored in each of the number of slices. In some embodiments, the method further comprises: determining a starting address and a size of the space before storing the numbers into the area.

In some embodiments, the method further comprises issuing an instruction to transmit content of the space in the main memory to a second space in a random-access memory (RAM) on a chip, wherein the instruction includes a starting address and a size of the space, and wherein the chip includes a computing unit comprising a plurality of multipliers. In some cases, the second space in the RAM has substantially the same size as the space in the main memory and is divided into regions and slices in substantially the same manner as the space in the main memory, and the transmitting includes arranging the content in the second space in substantially the same manner as in the space in the main memory. In some cases, the method further comprises issuing an instruction to: retrieve multiple numerical items from the same offset from a plurality of predetermined addresses in the RAM; and perform a plurality of parallel operations using the plurality of multipliers with the multiple numerical items to yield output data. In some cases, the plurality of predetermined addresses is beginnings of a plurality of the slices. In some cases, the plurality of objects corresponds to a plurality of layers of a neural network and each three-dimensional numerical array corresponds to a filter. In some cases, the method further includes assigning a second area within the one region to a second one of the plurality of objects.

In a separate yet related aspect, a non-transitory computer-readable storage medium with instructions stored thereon that is provided. The instructions when executed by a computing system, cause the computing system to perform a method of arranging data to accelerate deep computing, the method comprising: receiving, with aid of one or more processors, data regarding a plurality of objects, each containing a group of three-dimensional numerical arrays; allocating a space in a main memory to the plurality of objects, wherein the space includes a plurality of regions; assigning an area within one of the plurality of regions to one of the plurality of objects; determining a number of slices for the one object based on a size of the group and dimensions of the three-dimensional numerical arrays contained in the one object; dividing the area into at least the number of slices for the one object; and storing numerical items in the three-dimensional arrays contained in the one object across the number of slices such that at least one numerical item is stored in each of the number of slices.

In another aspect, an integrated circuit on a chip is provided. The integrated circuit on a chip comprises: a random-access memory (RAM) configured to store a set of items in a contiguous space; and a computing unit, comprising a plurality of multipliers configured to perform parallel operations in response to one or more instructions; and a plurality of multiplexers, wherein a subset of the plurality of multiplexers are connected with [input pins of] the plurality of multipliers, wherein the subset of multiplexers are programmed to transmit a subset of the set of items to the plurality of multipliers for the parallel operations using one offset from a plurality of predetermined addresses. In some cases, the chip utilized in the method includes a computing unit comprising a plurality of multipliers.

In some embodiments, the parallel operations are performed for multiple rounds to form an iterative process, and the parallel operations in a current round lead to a set of values to be processed in a next round of the iterative process. In some embodiments, the subset of multiplexers included in the chip receive a first set of control signals based on one of the one or more instructions, and wherein the first set of control signals determines one of a plurality of predetermined routes for transmitting the subset of items to the plurality of multipliers.

In some embodiments, the computing unit further comprises a plurality of adders connected with the plurality of multipliers. In some cases, the computing unit further comprises a second plurality of adders connected with the plurality of adders. In some cases, the plurality of adders is accumulators. In some cases, the computing unit further comprises a second subset of the plurality of multiplexers are connected with the plurality of adders, and wherein the second subset of multiplexers are configured to receive a second set of control signals based on one of the one or more instructions, and wherein the second subset of control signals determines one of a plurality of predetermined options for enabling accumulation in one or more of the plurality of adders. In some cases, a second subset of the plurality of multiplexers are programmed to receive items produced by the plurality of adders and transmit them to the RAM, the second subset of multiplexers are configured to receive a second set of control signals based on one of the one or more instructions, and the second set of control signals determines one of a second plurality of predetermine routes for transmitting items produced by the plurality of adders to a second offset from a second plurality of predetermined addresses in the RAM. In some embodiments, the computing unit further comprises a plurality of rectifiers connected with the plurality of adders. In some cases, a second subset of the plurality of multiplexers are connected with the plurality of rectifiers, the second subset of multiplexers are configured to receive a second set of control signals based on one of the one or more instructions, and the second set of control signals determines one of a plurality of predetermined options for enabling one or more of the plurality of rectifiers. In some cases, when the second set of control signals have predetermined values, at least one of the plurality of rectifiers is always disabled or periodically disabled. In some cases, a second subset of the plurality of multiplexers are programmed to receive items produced by the plurality of rectifiers and transmit them to the RAM, and the second subset of multiplexers are configured to receive a second set of control signals based on one of the one or more instructions, and the second set of control signals further determines one of a second plurality of predetermine routes for transmitting items produced by the rectifiers to a second offset from a second plurality of predetermined addresses in the RAM. In some cases, the RAM includes a plurality of regions, and the first set of control signals selects one of the plurality regions where the subset of items is stored. In some cases, the one region includes a plurality of consecutive, equal-sized slices, and the plurality of predetermined addresses corresponds to beginnings of the plurality of slices. In some cases, the subset of multiplexers are configured to receive a first set of control signals based on one of the one or more instructions, and the first set of control signals determines a value of the offset in the current round. In some cases, the value of the offset in the current round is incremented by a fixed amount, such as four in the next round.

In some embodiments, the chip further comprises a functional unit for expanding or contracting the set of values yielded in the current round. In some embodiments, the subset of the set of items processed by the chip corresponds to a plurality of pixels of an input feature map, and wherein the parallel operations performed in the current round on the chip corresponds to all multiplications required in applying one parameter of all filters for all channels in one layer of a convolutional neural network to the plurality of pixels of the input feature map. In some embodiments, the size of the plurality of multipliers is a power of two, such as 128. In some embodiments, the chip further comprises an instruction decoder to decode the one or more instructions and generate control signals.

It shall be understood that different aspects of the invention can be appreciated individually, collectively, or in combination with each other. Various aspects of the invention described herein may be applied to any of the particular applications set forth below.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 illustrates a typical CNN system that includes one or more convolution layers, one or more pooling layers, and various other operations.

FIG. 6 shows an exemplary arrangement of kernel parameters stored into slices within a contiguous region.

FIG. 7 shows an exemplary arrangement of input features stored into slices within a contiguous region.

FIG. 8 illustrates examples of padding the slices to accommodate kernels of different sizes and number of channels.

DETAILED DESCRIPTION OF THE INVENTION

Figure 2:
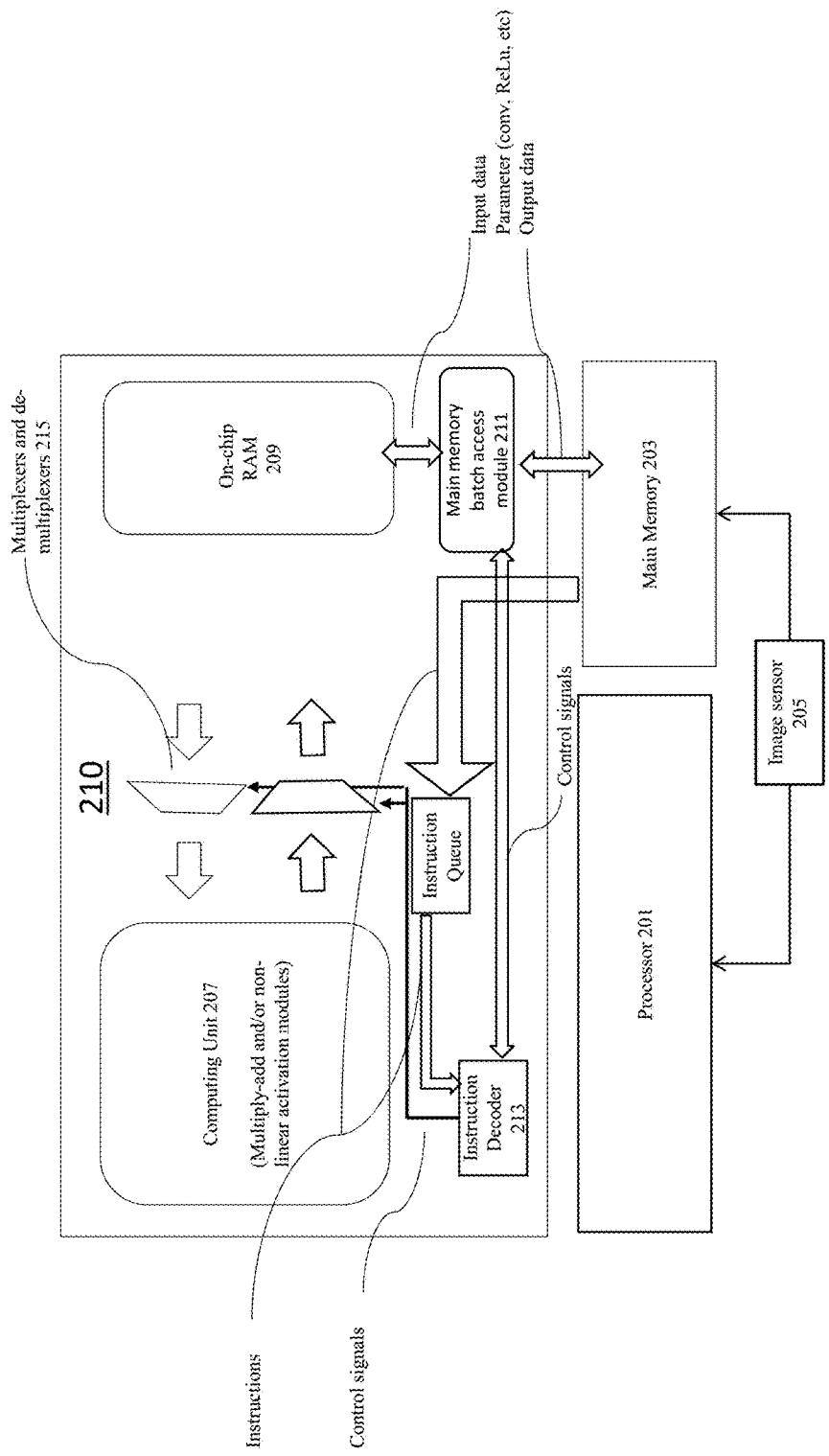
FIG. 2 illustrates an exemplary architecture of a system disclosed herein for applying a CNN.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Systems and methods are provided for data management so as to reduce memory access time and improve efficiency of computation. Various aspects of the invention described herein may be applied to any of the particular applications set forth below. The methods and systems may be applied to convolutional neural networks and other deep learning applications. The methods and systems may be used for model training or application. It shall be understood that different aspects of the invention can be appreciated individually, collectively or in combination with each other.

Systems and method provided herein may have the advantage of lower costs and power consumption, and higher performance over current technologies. An improved computation performance may be achieved at least by a computing unit capable of performing parallel operations. Data may be processed in parallel for efficient computation. The parallel operations may correspond to data processing in a layer of a convolutional neural network and feed to a next layer in a pipeline manner. Parallel operations may be realized using a small number of instructions. This may be advantageous in saving memory storage and improving computation efficiency. Additionally, the method and system provide an efficient data transmission between a main memory and a chip implements the parallel operations. The efficient data transmission may be achieved by dense parameter and input data packing. This data arrangement may also simplify instructions and reduce memory access. The parallel operations may include operations in a CNN layer and a smooth data pipelining or seamless dataflow between layers may be provided by data management. Data may be arranged and stored in accordance with one or more dataflow configurations within a plurality of calculation circuits on the chip. The rearranged data may improve computation performance and allow for an efficient utilization of calculation circuits such that a simplicity and compactness of the chip can be achieved.

Convolutional neuron network (CNN) systems commonly are composed of layers of different types: convolution, pooling, upscaling, and fully-connected neuron network. In some cases, an activation function such as rectified linear unit may be used in some of the layers. In a CNN system, there can be one or more layers for each type of operation. The input data of the CNN system may be the data to be analyzed. The image data may be image data, audio, video data and various others. FIG. 1 illustrates a typical CNN system 101 (Krizhevsky, A., Sutskever, I., & Hinton, G. E. (2012), Imagenet classification with deep convolutional neural networks, Advances in neural information processing systems, pp. 1097-1105) that includes one or more convolution layers, one or more pooling layers, and various other operations. As illustrated in part A, a CNN system may comprise any number of layers and any number of layers for different types of operations. The simplest architecture of a convolutional neural networks starts with an input layer (e.g., images) followed by a sequence of convolutional layers and pooling layers, and ends with fully-connected layers. In some cases, the convolutional layers are followed by a layer of ReLU activation function. Other activation functions can also be used, for example the saturating hyperbolic tangent, identity, binary step, logistic, arcTan, softsign, parameteric rectified linear unit, exponential linear unit. softPlus, bent identity, softExponential, Sinusoid, Sinc, Gaussian, the sigmoid function and various others. The convolutional, pooling and ReLU layers may act as learnable features extractors, while the fully connected layers acts as a machine learning classifier.

In some cases, the convolutional layers and fully-connected layers may include parameters or weights. These parameters or weights can be learned in a training phase. The parameters may be trained with gradient descent so that the class scores that the CNN computes are consistent with the labels in the training set for each image. The parameters may be obtained from a back propagation neural network training process that may or may not be performed using the same hardware as the production or application process.

A convolution layer may comprise one or more filters. These filters will activate when they see same specific structure in the input data. In some cases, the input data may be one or more images, and in the convolution layer one or more filter operations may be applied to the pixels of the image. A convolution layer may comprise a set of learnable filters that slide over the image spatially, computing dot products between the entries of the filter and the input image. The filter operations may be implemented as convolution of a kernel over the entire image as illustratively shown in part B. A filter may interchangeably refer to a kernel throughout this disclosure. A kernel may comprise one or more parameters. Results of the filter operations may be summed together across channels to provide an output from the convolution layer to the next pooling layer. A convolution layer may perform high-dimension convolutions. The filters should extend to the full depth of the input image. For example, if we want to apply a filter of size 5×5 to a colored image of size 32×32, then the filter should have depth 3 (5×5×3) to cover all three color channels (Red, Green, Blue) of the image.

In some cases, a convolution layer may be a depthwise separable convolution. In such scenario, a convolution layer may be factorized into a depthwise convolution and a 1×1 pointwise convolution to combine the outputs of the depthwise convolution. The convolution layer may be split into a layer for filtering (i.e., depthwise convolution layer) and a layer for combining (i.e., pointwise convolution layer). In some cases, in a depthwise convolution layer, a single filter may be applied to each input channel, and in a pointwise convolution layer, a 1×1 convolution may be performed to combine the output of the depthwise layer. In some cases, both of the depthwise convolution layer and the pointwise convolution layer are followed by an activation layer. In some cases, when the CNN is built on depthwise separable convolutions, the first layer may still be a full convolution.

The input data supplied to a convolution layer may be one, two, three, four, five, six, seven and more dimensions. In some embodiments, the input data supplied to an input layer such as a convolution layer may be dependent on the data characteristics. For example, if the input data are image data, the input data may be three-dimensional. As shown in FIG. 1, an input data may be an image with volume size of 224×224×3 representing a 224×224 pixels plane for each of three channels. An output feature map generated by a layer may be used as input feature map for a later layer. A size of input feature map (e.g., input data) for the hidden layers may be determined by a number of factors including the number of filters in the previous layers and one or more hyper-parameters. The convolution layer applies filters on input feature maps to extract embedded visual characteristic and generate the output feature maps. In some embodiments, the dimensions of the parameters may be four-dimensional and the input/output feature maps may be three-dimensional. For example, each feature map may be three-dimensional including with two-dimensional planes across multiple channels, and the three-dimensional feature maps are processed by a group of three-dimensional filters in a convolution layer. In some cases, there may be a one-dimensional bias that is added to the convolution results. For example, given the shape of the input feature map plane with size of H×H (i.e., weight and height) across C channels, and N filters each has C channels with filter plane dimension R×R (i.e., weight and height), the computation of the convolution layer may be defined as:

$$o[z][u][x][y]=B[u]+\Sigma_{k=0}^{C-1}\Sigma_{i=0}^{R-1}\Sigma_{j=0}^{R-1}I[z][k][Ux+i][Uy+j]\times W[u][k][i][j]$$

$$0 \leq z < N, 0 \leq u < M, 0 \leq x, y < E, E=(H-R+U)/U$$

Where O, I, W and B represent the matrices of the output features maps, input features maps, filters and biases, respectively. U represents the stride size.

Each convolution layer may comprise a plurality of parameters for the convolution operations. One or more filters may be comprised in each convolution layer. Each filter may comprise one or more parameters or weights. The size of the filters/kernels and the number of filter/kernels may together determine the parameters required for each convolution layer. For example, a convolution layer may comprise four kernels each is a 2×2 plane for three channels thus the resulting total number of weights for the layer is 4×2×2×3. In some embodiments, parameters may also include biases.

The size of the output volume of the convolution layer may also depend on hyper-parameters. The hyper-parameters may also control the size of the output volume of the convolutional layer. In some cases, the hyper-parameters may include depth, stride and zero-padding.

Depth of the output volume controls the number of neurons in the layer that connect to the same region of the input volume. All of these neurons will learn to activate for different features in the input. For example, if the first convolutional layer takes the raw image as input, then different neurons along the depth dimension may activate in the presence of various oriented edges, or blobs of color.

Stride controls how depth columns around the spatial dimensions (width and height) are allocated. When the stride is 1, a new depth column of neurons is allocated to spatial positions only one spatial unit apart. This leads to heavily overlapping receptive fields between the columns, and also to large output volumes. Conversely, if higher strides are used then the receptive fields will overlap less and the resulting output volume will have smaller dimensions spatially.

Sometimes it is convenient to pad the input with zeros on the border of the input volume. The size of this zero-padding is another hyper-parameter. Zero padding provides control of the output volume spatial size. In particular, sometimes it is desirable to exactly preserve the spatial size of the input volume.

The spatial size of the output volume can be computed as a function of the input volume size W, the kernel field size of the convolution layer neurons K, the stride with which they are applied S and the amount of zero padding P. The formula for calculating how many neurons fit in a given volume is given by $(W-K+2P)/S+1$. If this number is not an integer, then the strides are set incorrectly and the neurons cannot be tiled to fit across the input volume in a symmetric way. In general, setting zero padding to be $P=(K-1)/2$ when the stride is $S=1$ ensures that the input volume and output volume will have the same size spatially. In some cases, it is not necessary to use up all of the neurons of the previous layer.

FIG. 1 part B illustrates the computation of a convolutional layer. The convolutional layer receives N feature maps as input. Each input feature map is convolved by a shifting window with a K×K kernel to generate one pixel in one output feature map. The stride of the shifting window is S, which is normally smaller than K. A total of M output feature maps will form the set of input feature maps for the next convolutional layer.

FIG. 1 part A shows a CNN application. This CNN is composed of eight layers. The first five layers are convolutional layers and layers 6-8 form a fully connected artificial neural network. The algorithm receives three 224×224 input images that are from an original 256×256 three-channel RGB image. The output vector of 1000 elements represents the likelihoods of 1000 categories. As is shown in the figure, Layer1 receives three input feature maps in 224×224 resolution and 96 output feature maps in 55×55 resolution. The output of layer1 is partitioned into two sets, each sized 48 feature maps. Layer1's kernel size is 11×11 and the sliding window shifts across feature maps in a stride of four pixels. The following layers also have a similar structure. The sliding strides of other layers' convolution window are one pixel.

The number of feature maps can be controlled by controlling the number of filters used in the previous layer. The number of feature maps in the input layer may correspond to the number of channels (e.g., R, G, B). A filter may comprise one or more parameters or weights. A convolution layer may comprise a number of filters. In some cases, the number of filters and a size of a filter (i.e., number of parameters) may be selected for fully utilizing computing units or selected according to a computing capacity of the hardware. In some cases, the number of filters and size of filters may be selected such that a high-efficiency hardware configuration can be used for variable input data.

In some embodiments, a convolution layer and/or fully-connected layer may be followed by an activation layer, such as a rectified linear unit (ReLU). The ReLU layer may apply an elementwise activation function, such as the max(0,x) thresholding at zero. This may leave the volume of the input data unchanged. Other activation functions can also be used, for example the saturating hyperbolic tangent, identity, binary step, logistic, arcTan, softsign, parameteric rectified linear unit, exponential linear unit. softPlus, bent identity, softExponential, Sinusoid, Sinc, Gaussian, the sigmoid function and the like. In some cases, when the CNN comprises depthwise separable convolutions, each of the depthwise convolution and pointwise convolution layers may be followed by a ReLU layer.

In the example as illustrated in FIG. 1 part A, the CNN system may consist of several convolutional layers and pooling or sub-sampling layers. A pooling layer may be a form of non-linear down-sampling. A pooling layer may perform down-sampling to reduce given feature maps to a stack of reduced feature maps. The pooling layer may progressively reduce the spatial size of the input data to reduce the amount of parameters and computation in the network, and hence to also control overfitting. There are several functions to implement pooling such as max pooling, average pooling, or L2-norm pooling. For example, in max pooling operations, the given feature maps may be partitioned into a set of non-overlapping rectangles and, for each such sub-region, outputs the maximum value. In another example, in an average pooling, an average value of a sub-region may be output. The given feature maps can be partitioned by any size. For example, pooling may be applied with filters of size 2×2 applied with a stride of 2 at every depth slice. A pooling layer of size 2×2 with stride of 2 shrinks the given feature maps to a ¼ of its original size.

The output of the pooling layer may be fed to the fully-connected layer to perform pattern detections. In some cases, the fully-connected layer may be for classification purposes that filters may be applied on the input feature maps. The filters may be of the same size as the input feature maps. The fully-connected layer may apply a set of weights or parameters in its inputs and accumulate a result as the output of the fully-connected layer. In some cases, an activation layer may immediately follow the fully-connected layer and output the result of the CNN system. For example, for classification purposes, the output data may be a vector holding classification scores.

The computing architecture may be a pre-trained convolutional neural network. A CNN model may comprise one or more convolution layers. A CNN model may comprise from one to several hundred convolution layers. A CNN model may comprise one or more pooling layers. In some cases, the pooling layer may immediately follow a convolution layer. In some embodiments, ReLU activation operations are combined with convolution operations such that convolution results are processed by activation functions immediately. In some embodiments, convolution and pooling layers may be applied to input data multiples times prior to the data being transmitted to a fully-connected layer. The fully-connected layer may output the final output value which is tested to determine whether a pattern has been recognized or not.

A system is provided for accelerating implementation of select algorithms by improved processing parallelism and memory access through a specifically designed integrated circuit. The select algorithms, such as application of a CNN, may comprise a large number of matrix-matrix multiplications and/or matrix-vector multiplications. The integrated circuit may contain a memory unit and a computing unit capable of performing multiple iterations of parallel operations based on a reduced number of control signals. In some cases, the data is arranged and/or padded with zeros for such that the arrangement of data is aligned with a pre-determined hardware configuration. The data may be arranged to be in accordance with a pre-determined dataflow or data path based on a configuration of hardware circuitries.

In a CNN system, the data involved include CNN parameters and input/output features. A typical CNN system as described above may include a multi-channel convolution layer, max or average pooling layer, Rectified Linear Unit (ReLU), and fully-connected layer. Both fully-connected and multi-channel convolution layers contain large number of numeric weights or parameters that represent the strength of connections between neurons. The data to be loaded to the integrated circuit on a chip may be prepared by a host processor and stored in a main memory, and the data may be transmitted to the chip in a batch fashion.

The CNN parameters may include a plurality of parameters for a convolution layer including but not limited to weights or parameters, biases, hyper-parameters such as padding, stride and depth as described above. The CNN parameters may also include parameters to be used in other types of layers such as fully-connected layer.

The parameters may be arranged and classified into a plurality of groups. In some embodiments, the parameters may be grouped by layers. For example, different layers of the CNN system may correspond to different groups of parameters. The parameters for each layer may be large dimensional matrices. A group of parameters may be stored in a contiguous space. The parameters contained in a group or corresponding to a layer may be stored consecutively in a contiguous space. The parameters within a group may be arranged to be in accordance with the functions or operations performed in a layer of the CNN. Details about the data arrangement is described later herein.

The input data can include image data or sampled speech signals. For example, the image data may include a plurality of image pixel values. The data can be various data types, such as scalar integer, scalar floating point, packed integer, packed floating point, vector integer, vector floating point, and the like.

FIG. 2 illustrates an exemplary architecture of a system disclosed herein for applying a CNN. The system may include an integrated circuit 210 implementing application of a CNN system. The system may also include a main processor 201 and a main memory 203 for arranging and storing the data that are to be processed by the integrated circuit 210. The integrated circuit may comprise a computing unit 207 for performing multiplications, additions, and other related operations, an on-board memory unit 209 for storing a set of items such as parameters, biases and input data to be supplied to the computing unit, and communication unit 211 for handling data transmission between the integrated circuit and a main processor 201, various other functional circuits. In some embodiments, the integrated circuit 210 may comprise: a random-access memory (RAM) configured to store a set of items in a contiguous space; and a computing unit, comprising a plurality of multipliers configured to perform parallel operations triggered by instructions; and one or more multiplexers connected with the plurality of multipliers, wherein the one or more multiplexers are programmed to produce a subset of the set of items to be transmitted to the plurality of multipliers for the parallel operations, by using one offset from a plurality of predetermined addresses.

The system may be used for data management and processing. The data to be processed may be captured by a device 205 and transmitted to a processor 201. For example, the input data may be image data captured by an image sensor 205. The input data received by the processor may be arranged and organized to be in accordance with a hardware configuration of the chip 210. Then the arranged input data may be stored into a contiguous space in the main memory 203. One or more CNN model containing a plurality of kernel parameters, biases and various other data used for CNN processing may be stored in the main memory. The CNN model data and the input data may be transmitted to the chip by the batch access module 211 in response to a data transfer instruction issued by the processor 210. The CNN model data and the input data may or may not be transmitted using the same communication link. The CNN model data and the input data may or may not be transmitted to the same on-chip memory. In some cases, the CNN model data may be transferred from the main memory to an on-chip RAM 209 whereas the input data may be transferred to an input data buffer on the chip. Typically, both of the input data and the CNN model data are transferred and stored into contiguous regions of the on-chip RAM. The data may have the same storage layout between the RAM and the main memory. Additional instructions are also transmitted to from the main memory. The instructions may be decoded by the instruction decoder 213 into control signals and used to control dataflows and data paths within a computing unit 207 of the chip and between the computing unit and the on-chip RAM. The input data, parameters and biases may be retrieved from the RAM and supplied to the computing unit of the chip according to a pre-determined data route or data path. One or more multiplexers 215 may be used for controlling the data route or data path according to the control signals decoded from the instructions. The output results of a layer of operations may be fed back to the computing unit as input feature map for the next layer of operations. The final output results of the CNN system may then be transferred back to the main memory by the batch access module.

The integrated circuit 210 can be any suitable computing platforms, microprocessors, or logic devices. The integrated circuit can be integrated to any other devices such as handheld devices, tablets, notebooks, systems on a chip devices, cellular phones, internet protocol devices, digital cameras, personal digital assistants, and embedded applications such as microcontroller, digital signal processor, system on a chip, network computers, set-top box, network hubs, smart appliances, or any other system that can perform the functions and operations described elsewhere herein.

The memory unit 209 may be on-board the integrated circuit. The memory unit can be any suitable RAM including static random-access memory (SRAM), dynamic random-access memory (DRAM), synchronous dynamic random-access memory (SDRAM), double data rate (DDR), double data rate synchronous dynamic random-access memory (DDR SDRAM), DDR, DDR2, DDR3, T-RAM, Z-RAM, and so forth.

The computing unit 207 may include a plurality of calculation components to perform different layers of CNN. In some embodiments, the plurality of calculation components may be adapted for requirements of different layers of CNN. For example, the plurality of calculation components may be used for performing the convolution operations in the convolution layer, average or max operations for the pooling layer, and/or dot product operations in the fully-connected layer. In some cases, configuration of the computing unit may be controlled through interconnections among a plurality of calculation circuits.

The computing unit 207 may comprise arrays of calculation circuits. The calculation circuits may include arithmetic logic units (ALUs). The ALUs may be in the arrays that are connected via a network which may depend on the dataflow requirements. In some cases, the computing unit may be in the form of fine-gained spatial architectures such as FPGA. Other architectures such as application-specific integrated circuit (ASIC) can also be used. In some cases, the calculation circuits may comprise a plurality of multipliers. In some cases, the calculation circuits may comprise a plurality of multiplier-accumulator units (MACs). The computing unit may include an ALU datapath which is capable of performing multiplications followed by addition/accumulations. In some cases, a FIFO may be used to control the traffic going in and out of the computing unit. The computing unit may comprise a plurality of multipliers and accumulators. For example, the computing unit may comprise 32, 64, 128, 256, 512 and more multipliers. Each multiplier may include a first input to receive a value of an input signal and a second input to receive a weight or kernel parameter. Multipliers may be hardware components that perform multiplication operation of integer or fixed-point inputs. The multipliers may be for example 8-bit or 16 bit fixed-point multipliers.

The accumulators may include one or more adders for summing products from outputs of multipliers. The adders may be multiple input adders. For example, the adders may be 2-input adders, 4-input adders, 8-input adders. In some cases, the inputs of the adders and multipliers may be selectively controlled by one or more multiplexers.

The one or more multiplexers 215 may be connected with the plurality of multipliers and/or adders. The one or more multiplexers may receive a set of control signals to determine one of a predetermined plurality of routes for transmitting data to the plurality of multipliers. The control signals may be decoded from various commands for the multiplexers, including the input source selection for computation, either from the image buffer or from the output of the previous layer in the RAM, selection of parameters, biases, input features in the RAM, and so forth. The multiplexers may also be connected with one or more rectifiers for controlling enablement of the rectifiers that are incorporated into the convolution layer. For instance, the multiplexer may receive control signals that decoded from an activation function enablement instruction to control the rectifier. In some cases, one or more multiplexers may also be included for outputting the calculated result of a layer to a memory. The multiplexers may take one data input and a number of selection inputs, and they have several outputs. They forward the data input to one of the outputs depending on the values of the selection inputs.

Each multiplexer may include multiple input selector pins for n inputs and output 1 selected input. A multiplexer could be any size of n-to-1 where n can be 2, 4, 8, 16, 32, and so on. In some cases, a small number of large multiplexers may be used. In some cases, a large number of small multiplexers may be used. In some cases, multiplexers may be chained together to construct a large multiplexer.

In some embodiments the same computing unit may be used to perform convolution, average, maximum value, or dot-product operations without changing the components configuration and interconnections. In some embodiments, different calculation circuits may be used for different types of layers. For example, different sets of calculation circuits may correspond to convolution layers, pooling layers and upscaling layers.

The integrated circuit may further comprise other components for various internal communications on chip and communications between an external memory and the chip. The components may include buffers for efficient reuse of input or intermediate data. The size of the buffer can be in any range such as from 100 kB to 500 kB.

As mentioned above, the control signals input to the multiplexers may be decoded by one or more instruction decoders 213. The instruction decoders may decode instructions, and generate an output of one or more micro-operations, micro-code entry points, microinstructions, control signals for the multiplexers, other instructions or other control signals, which are decoded from, or which otherwise reflect, or are derived from, the original instructions. The decoder can be implemented using various suitable mechanisms. For example, the decoder can be implemented using look-up tables, hardware implementations, programmable logic arrays (PLAs), microcode read only memories (ROMs), and the like. The decoder may be coupled to the one or more multiplexers and connected to a main memory storing instructions via FIFO. In some cases, the decoder may be configured to decode instructions stored in one or more instruction registers.

The integrated circuitries may also comprise one or more registers. A register may hold an instruction, a storage address, interrupt number, or any kind of data (such as a bit sequence or individual characters). A register may have various sizes, for example, a register may be 64 bits in length for holding long instructions or half-registers for shorter instructions. Details about the registers are discussed later herein.

The integrated circuits may comprise various other computer architectures to assist communication with an external processor or memory. The communication modules may include suitable means for instruction and data transfer. Various means can be employed for communication such as peripheral component interconnect card, computer buses including but not limited to PCI express, PCI-X, Hyper-Transport, and so forth. The integrated circuit receives commands and parameters from the main memory 203 through the data bus (e.g., AXI4lite bus) and communicates with main memory batch access module 211 through FIFO interfaces. This main memory batch access module can access external memory through the data bus. In some cases, interruption mechanism may be enabled between the integrated circuit and an external processor to provide an accurate time measurement. In some cases, the data loading routine may be implemented with a direct memory access method to achieve high bandwidth access to the main memory. The data to be loaded from the main memory to the on-chip RAM may include various data contained in a CNN model such as kernel parameters, biases and the like. The data may be pre-arranged and stored in a contiguous space on the memory. In some cases, the address and size of the contiguous space may be specified in an instruction for transmitting the data. The data may be loaded directly to the RAM on the chip. In some cases, the data may be written directly to the on-chip RAM with direct memory access method.

The system may comprise a main processor 201 external to the integrated circuit. The processor may be configured to pre-process or arrange parameters and/or input data prior to loading the data to the integrated circuit. The processor may arrange the parameters and/or input data into groups. In some cases, the groups may correspond to layers in the CNN system.

The processor may be a hardware processor such as a central processing unit (CPU), a graphic processing unit (GPU), or a general-purpose processing unit. The processor can be any suitable integrated circuits, such as computing platforms or microprocessors, logic devices and the like. Although the disclosure is described with reference to a processor, other types of integrated circuits and logic devices are also applicable. The data arrangement and data manipulations can be applicable to any processor or machines capable of performing data manipulations. The processors or machines may not be limited by the data operation capabilities. The processors or machines may perform 512 bit, 256 bit, 128 bit, 64 bit, 32 bit, or 16 bit data operations.

In some embodiments, the processor may be a processing unit of a computer system. Details regarding the computer system is described with reference to FIG. 15 later herein.

In some cases, the processor 201 may be coupled to another device or data source for receiving input data. The input data are to be analyzed by the CNN system. The input data can be images, text, audios, and the like. The input data may be obtained from other devices or systems. For example, the input data can be image data captured by an imaging device 205. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The image data may have various sizes dependent on the image frame resolution. The image frame resolution may be defined by the number of pixels in a frame. In examples, the image resolution may be greater than or equal to about 128×128 pixels, 32×32 pixels, 64×64 pixels, 88×72 pixels, 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels.

In some embodiments, the processor may be configured to preprocess the input data and/or coarsely analyze the input data. In some cases, the processor may reprocess the input data so as to save memory space. In some cases, the processor may run a coarse analysis of the image data to gain preliminary information so as to decide the parameters to be used for CNN operations. For example, when the input data are images, the images may be for example resized to match a desired data size. In some cases, the image may be divided into segments then merged back to original image after process. In some cases, the image may be down-sized using any suitable down-sizing techniques. In some cases, the image may be partitioned. The images may be portioned according to targets extracted from the images. The images may be pre-classified according to an interest object or target pattern. For example, the images may be examined to extract a specific target such as a car contained in the image. Accordingly, a CNN model corresponding to vehicle types may be selected by the processor for further CNN analysis. Various pattern recognition or pattern matching techniques may be used for the pre-classification process such as supervised or unsupervised machine learning techniques.

Figure 3:
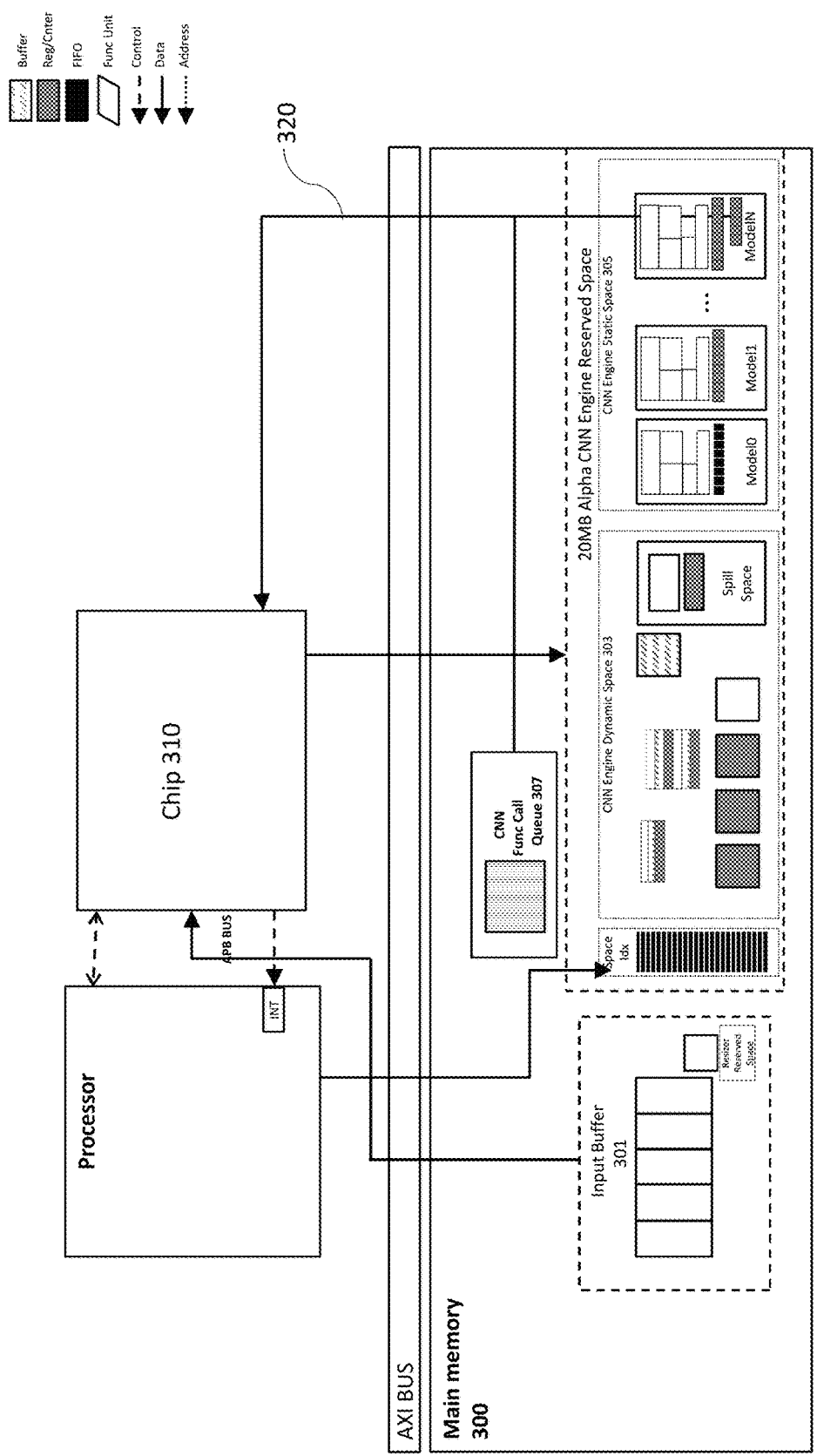
FIG. 3 illustrates an exemplary data organization in a main memory of the system.

FIG. 3 illustrates an exemplary data organization in a main memory 300 of the system. The main memory may be used by or coupled to the processor. The main memory can be any suitable memory including static random-access memory (SRAM), dynamic random-access memory (DRAM), synchronous dynamic random-access memory (SDRAM), double data rate (DDR), double data rate synchronous dynamic random-access memory (DDR SDRAM), DDR, DDR2, DDR3, T-RAM, Z-RAM, and so forth.

The main memory may store various instructions, data for processing including input data and parameters to be loaded to the CNN system. In some cases, the main memory may also receive output results of the CNN system and/or intermediate results generated during a CNN operation. The data may include input data to be analyzed using the CNN system. The input data can be images, text, audios, and the like. The input data may be obtained from other devices or systems. For example, the input data can be image data captured by an imaging device. The image data generated by an imaging device can include one or more images, which may be static images (e.g., photographs), dynamic images (e.g., video), or suitable combinations thereof.

The images may be preprocessed before stored in an input buffer 301. The images may be for example resized to match a desired data size. In some cases, the image may be divided into segments then merged back to original image after process. In some cases, the image may be down-sized using any suitable down-sizing techniques. In some cases, the image may be partitioned. The images may be portioned according to targets extracted from the images. The images may be pre-classified according to an interest object or target pattern. For example, the images may be examined to extract a specific target such as a car contained in the image. Accordingly, a CNN model corresponding to vehicle types may be selected for further CNN analysis. Various pattern recognition or pattern matching techniques may be used for the pre-classification process such as supervised or unsupervised machine learning techniques. In some embodiments, the main memory includes a space index 302 for holding information regarding the CNN models and the overall layout of the main memory. In some cases, the size of the space index 302 is less than 2 MB.

As mentioned above, once a target classification is identified, a corresponding CNN model may be selected. One or more CNN models may be stored in a static space 305 of the main memory. In some embodiments, the network parameters and corresponding instructions for each model require approximately 2 MB, and approximately 32 MB is allocated to the static space 305. In some cases, each model may be associated with a category or class of items. For example, a model associated with human may contain parameters to be used in CNN operations to classify different human types (e.g., male, female, child, or adult), whereas a model associated with vehicle may contain parameters for a CNN system to classify different vehicle types. The one or more models may be pre-trained. Each model may comprise a plurality of parameters for different layers of the CNN system. As described later herein, the plurality of parameters may be arranged and grouped in a way so as to reduce traffic between the main memory and the integrated circuit.

As mentioned above, data included in the CNN model may be loaded form the main memory to the on-chip RAM 320. The data may include various data contained in a CNN model such as kernel parameters, biases and the like. The data may be pre-arranged and stored in a contiguous space within the memory. In some cases, the address and size of the contiguous space may be specified in an instruction for transmitting the data. The data may be loaded directly to the RAM on the chip. In some cases, the data may be written directly to the on-chip RAM with direct memory access method.

In some embodiments, the main memory may also comprise dynamic space 303 in case data needs to be transferred or spilled from the SRAM of the integrated circuits to the main memory. In some cases, to hold temporary data and some output data, the size of the dynamic space 303 is approximately 6 MB. The spilled data may be intermediate results generated during CNN operations. The final output of the CNN system may also be transmitted from the integrated circuit to the main memory and stored in the dynamic space 303. In some cases, only a classification score may be transmitted to the main memory. In some cases, output results of each layer may be transmitted to the main memory.

The main memory may comprise a space for storage of instructions 307. Various instruction sets may be loaded from a main memory to one or more buffers via FIFOs of the integrated circuit. The instructions may correspond to different levels operations in a CNN system. For example, the instructions may include high-level instructions corresponding to layers of the CNN such as types of layers (e.g., convolution, pooling, upscale, etc), low-level instructions corresponding to different types of operations including but not limited to convolution, elementwise convolution, upscale, return, or pooling at matrix/matrix or vector/matrix data level, and various data transfer instructions such as read/write between a main memory and SRAM on the chip, and fetch data from buffers to the computing unit on the chip.

The instructions may have various types including but not limited to: computational, logical, control, and data transfer instructions. Different instructions may differ in their numbers of valid bits. The instruction length may or may not be fixed. In some cases, the instruction length may be fixed (e.g., 64-bit) for the memory alignment and for the design simplicity of the load/store/decoding logic.

The instructions may include matrix instructions, such as matrix-matrix multiplication instruction. The instruction may specify the address and size of the input feature map matrix and parameter matrix. The instruction may be used to invoke a convolution operation. The instructions may include a matrix-matrix multiplication and elementwise activation instruction. This instruction may be used to instruct a convolution and ReLU activation. The instruction may specify the address and size of the input feature map matrix, parameter matrix, and the bias vector. The instructions may include logical instructions (e.g., MAX comparison function unit) for pooling operations. For example, the instruction may compare the output elements generated by the convolution layer to look for the maximum value among a pooling window.

As described previously, in the convolution layer, the convolution operations as presented in the equation can be run at high parallelism. However, a significant amount of intermediate data, i.e., partial sums of the convolution results can be generated by the parallel multiplier-accumulator units simultaneously, which would require additional storage and consume additional memory read/write energy. Fortunately, due to the weight sharing property in the convolution layers, an input data can be shared across many operations. For example, each filter or kernel's parameters may be reused several times in the same input feature map plane, and each input feature map pixel may be reused across several filters. Therefore, a method is provided for arranging input data and parameters to reduce the quantity of intermediate results and increase reusing of shared parameters or input data, which in turn reduces data transmission bandwidth between the computing unit and RAM, and increases throughput and energy efficiency. The data management may allow for one or more layers of computations performed simultaneously with significantly reduced memory access times and in some cases, only the output feature map of the entire layer may be output and stored in a memory.

Figure 4:
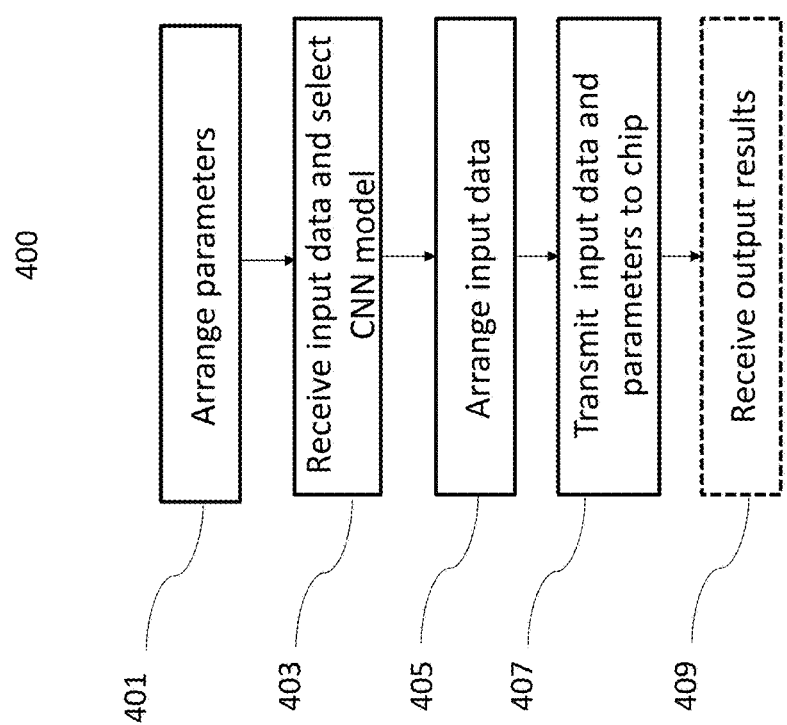
FIG. 4 shows a flow diagram of an exemplary method performed by a processor of the system of setting up CNN parameters and input features for convolution computation, in accordance with embodiments of the invention.

FIG. 4 shows a flow diagram of an exemplary method 400 performed by a processor of the system of setting up CNN parameters and input features for convolution computation, in accordance with embodiments of the invention. Method 400 may be performed by processing logic that may include hardware (e.g., circuitry, dedicated logic, programmable logic, or microcode), software (e.g., instructions run on a processing device, a general-purpose computer system, or a dedicated machine), firmware, or a combination thereof. In some embodiments, method 400 may be performed by the processor 201 with respect to FIG. 2.

For illustration purposes, the method 400 is depicted as a sequence of acts or operations. However, acts in accordance with this disclosure can occur in various orders and/or concurrently and with other acts not represented and described herein. Additionally, not all of the acts as described in the method are required to be performed for implementing the method. Those skilled in the art will understand and appreciate with that method 400 could alternatively be represented as a series of interrelated states via a state diagram or events.

Referring to FIG. 4, the integrated circuit or chip may be coupled to a main memory which contains data and parameters that are pre-arranged by a main processor. The chip may comprise processing logic that may be configured to perform any one of convolution operations, average or max pooling operations, ReLU activations, or dot product operations that associated with a CNN system. At step 401, the main processor may store one or more CNN models within a memory coupled to the processor. Each CNN model may comprise kernel parameters, biases, or hyperparameters, and other data (e.g., layer types) that for CNN operations. In some cases, the CNN models may be pre-trained and stored in a main memory external to the chip. In some cases, the CNN models may be an initial model to be trained that the model may comprise the initial values of parameters and data to be trained. The main processor may arrange the parameters associated with each CNN model such that all parameters of the CNN model can be compactly stored in a contiguous space within the memory. In some cases, the parameters may be classified into a plurality of groups with each group associated with a convolution layer in the CNN. The parameters within a layer/group may be arranged and stored consecutively in a contiguous space. The contiguous space for storage of the parameters within the same layer can be identified by an address and a size. In some cases, the address can be the beginning address of the contiguous space. In some cases, the address can be an offset based off the beginning address of the contiguous space. A CNN model may comprise one or more convolution layers thus one or more groups of parameters. Inter group/layer order for parameters storage may or may not be the same as the order for CNN operations. In some cases, parameters associated with a later convolution layer may be stored with an address prior to an early layer. In some embodiments, the contiguous space may be divided into a plurality of regions and each region may be contiguous. In some cases, each region may be further divided into slices. Each slice may be a contiguous space. Details regarding the data arrangement are discussed later herein.

At step 403, the main processor may receive input values. The input values may be the input data such as image or speech signals, texts, from which certain patterns are to be analyzed by the CNN system. The input data can be any format and have any data length, such as 8 bits, 16 bits, 32 bits, or any number of bits that may be suitable stored in data storage. The input data may be processed by the main processor to determine which CNN model to be used for CNN operations. For example, when the input data are image data, any suitable image processing techniques may be used to extract pattern or target from the image and according to the extracted information (e.g., vehicle, animal, human expression, gestures, etc) to select a CNN model. The CNN model may be selected based on various criteria. For instance, a CNN model may be selected according to the classification or category of the target contained in the input data, the type of input data (e.g., audio, image, text, etc), and various other characteristics of the input data. In other instances, the CNN model may be selected based on the goal of the CNN analysis or a performance requirement of the CNN operations (e.g., computation speed, capability, etc).

At step 405, the main processor may arrange the input data and store the data into a space on the main memory. The data stored in the main memory may be the raw or processed input data rearranged by the main processor. For example, the processed input data may be a down-sized image data or a segmented image data. In some cases, the input data may be arranged according to the selected CNN models. In some cases, the input data may be arranged according to a pre-determined configuration of the chip, which determines the CNN dataflow or data transmission routes. In some cases, the input data may be arranged and zero-padded to conform to the pre-determined configuration of the chip for dataflow or data transmission route in the CNN system. In some cases, the input data may be arranged so as to be stored in a contiguous space within the memory. The contiguous space may be identified by an address and a size of the space. The contiguous space may comprise a plurality of contiguous slices. The arrangement of the input data may be similar to the arrangement of the parameters.

At step 407, the input data, various CNN model parameters and associated data may be transmitted from the main memory to a random-access-memory (RAM) on the chip. The data to be transmitted may comprise the arranged input data, parameters and other data such as biases, instruction sets associated with the selected CNN model. The data may be loaded to the on-chip RAM and stored in a similar manner as the data stored in the main memory. For example, the parameters and input data may still be stored in a contiguous space which can be identified by an address and a size of the space. The contiguous space may be divided into one or more contiguous regions. The contiguous space or region may be divided into one or more contiguous slices. The slices may be identified by an offset address according to a base address of the contiguous region and a size of the slice. In some cases, the size of the slice may be variable depending on the total size of the parameters in a layer and the total number of slices. The total number of slices may be a variable or a fixed number. In some cases, the total number of slices and the number of units along the slice direction together define a data block which is to be processed by the computing unit in a batch manner. In some cases, the size of the slice may be a pre-determined size whereas the total number of slices may be variable. The size of the slice may vary in a wide range such as from 1 byte to thousands of bytes. For example, given an input image having 128×128 pixels in three channels and a first layer of a CNN having 16 5×5 kernels in three channels, the system can choose to have eight slices for storing the input image. The size of each slice can then be 8,192B (2 to the $13^{th}$ power) to fit all the features in the input image. This size also allows padding so as to utilize one of the predetermined chip layouts, as further discussed below. The system can also choose to have eight slices for storing the CNN weights, each having approximately 150B, and four slices for storing the CNN biases.

In some cases, the contiguous space in the RAM may have the same size as the contiguous space in the main memory. The contiguous in the RAM may receive the data from the contiguous space in the main memory without alternating the arrangement of the data. In some cases, information regarding the data arrangement may also be transmitted to the RAM. Such information may include address and size of the contiguous space, address and size of the contiguous region, slice number, slice index, offset within a contiguous region and the like. The information may be contained in the instructions or with the data transmitted from the main memory to the chip.

The processor issues instructions (including high-level functional calls) to apply the selected CNN to given input features. Such instructions are initially stored in a specific area within the memory, as discussed above. The instruction set associated with the selected CNN may then be transmitted from the main memory to one or more buffers via FIFOs of the integrated circuit. The instructions may correspond to different levels operations in the selected CNN model. For example, the instructions may include high-level instructions corresponding to layers of the CNN such as types of layers (e.g., convolution, pooling, upscale, etc), low-level instructions corresponding to different types of operations including but not limited to convolution, elementwise convolution, upscale, return, or pooling at matrix/matrix or vector/matrix data level, and various external data transfer instructions such as read/write between a main memory and SRAM on the chip, and internal data flow instructions such as fetching data from buffers to the computing unit on the chip.

The data transmission may be performed in response to an instruction. The instruction may be issued from the processor. For example, the data transmission can be controlled by a software or application running on the processor. The instruction may comprise at least an address and a size that together identify a contiguous space storing the input data and an address and a size that identify a contiguous space storing the parameters of the CNN model. For instance, the size of the input data or parameters may be specified by the data-width operand in the data transfer instructions. In some cases, the data transfer instruction may also include an offset of the slice and the pre-determined size of the slice within a group/layer. The instruction may be transmitted to the integrated circuit via a FIFO and decoded by a decoder. Then control signals generated by the decoder may trigger a main memory batch access module to load data from the memory to the SRAM.

At step 409, after all the CNN operations are done, an interrupt control signal may be generated by a decoder on the chip and sent to the main memory batch access module to trigger transmitting the output data from the RAM to the main memory. In some cases, the output results of a CNN system may be a classification score vector. The output results may be stored and/or presented to a user via a computer system/processor coupled to the main memory. The classification results can be used in various ways and applied to various applications. For example, the output results can be displayed on a display device to a user or used to generate control signals or instructions for controlling another device.

As mentioned above, the parameters and various other data (e.g., bias) used for CNN may be arranged to be stored in a main memory and RAM on the chip. The parameters and various other data (e.g., bias) may be classified into a plurality of groups. The grouped parameters may be stored into a plurality of regions with each region corresponding to a group. The various data for CNN may be grouped according to different layers of the CNN. In some embodiments, the plurality of groups may correspond to a plurality of layers of a CNN. In some cases, a group corresponds to a layer such as a convolution layer, a fully-connected layer. In some cases, a group corresponds to two or more layers or different operations. For instance a group may correspond to a convolution layer and a pooling layer, a convolution layer and ReLU activation, a convolution layer and upscale layer, a fully-connected layer and ReLU activation layer and so forth.

Figure 5:
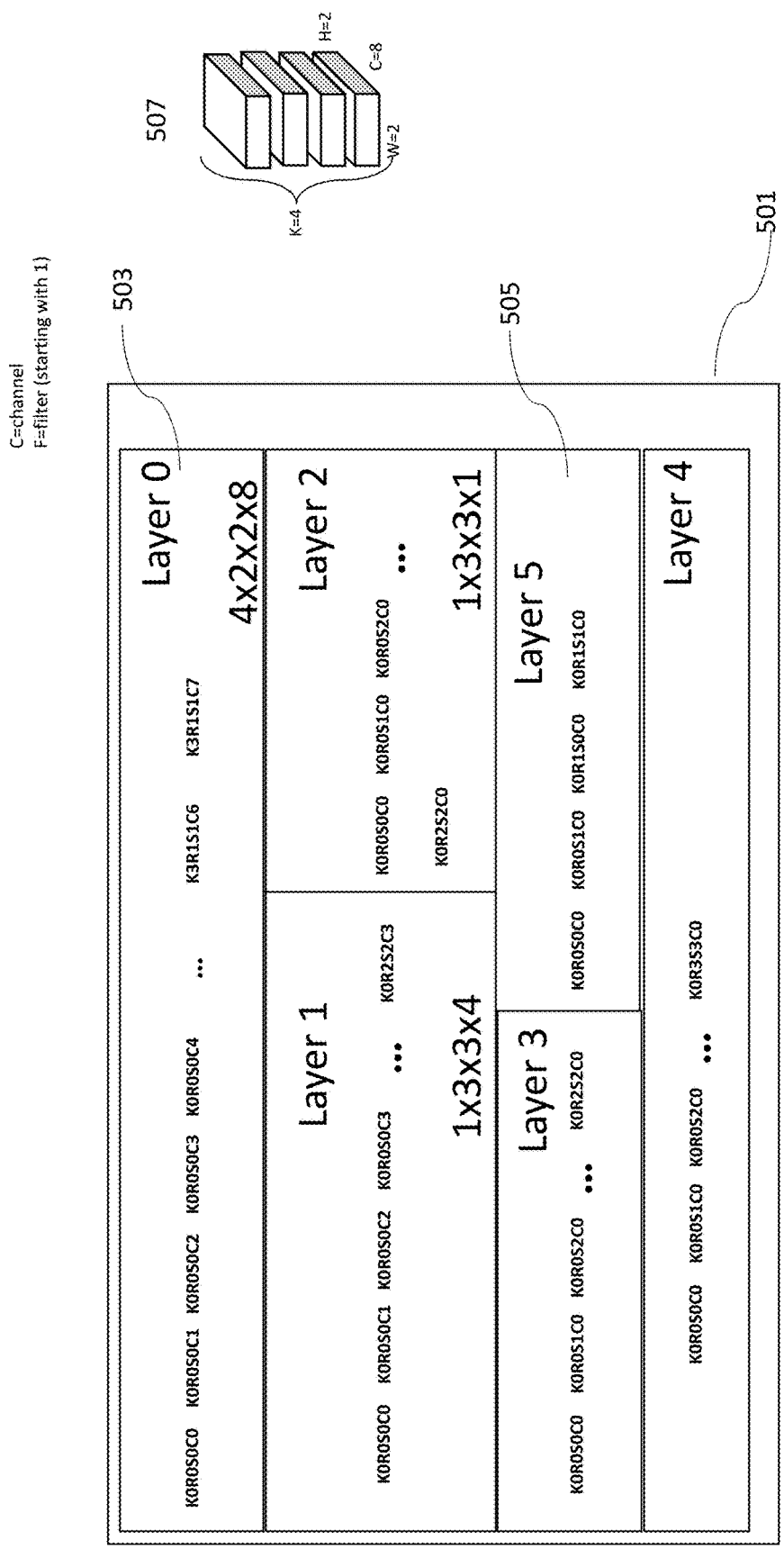
FIG. 5 illustrates an exemplary arrangement of CNN parameters in a main memory or a random access memory (RAM) on a chip of the system.

FIG. 5 illustrates an exemplary arrangement of CNN parameters in a main memory or a random access memory (RAM) on a chip of the system. The space 501 as illustrated may be a contiguous space for storage of data associated with a CNN model. The data may be parameters to be used in a CNN system. The data may also comprise other data such as bias for a CNN system. A CNN may comprise one or more convolution layers. Different convolution layers may or may not have different number of kernels, different kernel sizes, and different numbers of channels. It should be noted that the parameters illustrated in the figure are kernel parameters for each layer, however the contiguous space may also store other data such as biases for each layer. In some cases, all the data are used as input for a plurality of multipliers. In some cases, some of the data are used as input for a plurality of multipliers whereas others are not. As shown in the figure, the parameters are to be supplied to a plurality of multipliers in parallel. In the example, the CNN may comprise five convolution layers. Layer 0 503 may be the input layer. Layer 0 may include 4-dimensional parameters as illustrated in 507. For example, the parameters in Layer 0 may have a dimension of 4×2×2×8, corresponding to four kernels each of which is a 2×2 plane across three channels. The parameters may be stored in a contiguous region 503 within the memory. The sequence of data points $K_iR_jS_mC_n$ represents the parameters included in Layer 0, where i represents the index number of kernels (K), j and m represents index in the row (R) and column (S) of the kernel in a plane, and n represents the index for channel (C). Each contiguous region may correspond to a plurality of parameters associated with a layer. The contiguous region may have variable sizes determined by the total number of parameters of a layer. Alternatively, the contiguous region may have a fixed size such that the contiguous region may be aligned. The contiguous region may or may not be completely filled depending on the different number of parameters of different layers. In some cases, the contiguous space may be dense packed to reduce unused space. For example, a small region Layer 5 505 may be stored together with another small region Layer 3, or Layer 1 and Layer 2 are stored together such that the whole space 501 may be contiguous and compact. Parameters of different groups are aligned with a length of a contiguous region such that unused space may be reduced. Contiguous space may refer to a space on a memory without or with reduced unused space. Such type of data arrangement provides a data structure alignment with respect to a fixed region size as well as save total memory space for data storage.

The parameters within a group of parameters associated with a layer may be arranged in accordance with information about the CNN. The information regarding the CNN may include for example, a distinct combination of a number of filters/kernels [K], a number of channels [C], and a filter size [P]. In some embodiments, the space within a contiguous region where data associated with a layer is stored may be divided into a number of slices. Alternatively, the number of slices and size of each slice may generally be determined based on a kernel size. Various other ways may be used for dividing the region into slices based on the order that in which the convolution operations are applied along different dimensions. Different arrangements of the parameters into the slices may determine different data flows in the computing unit. In some embodiments, the number of slices and size of each slice may be determined based on the number of channels. In some cases, the number of slices may be determined based on both a size in the channel dimension and the number of kernels. As mentioned above, the parameters are high-dimension such as a 4-dimension including number of kernels, channels, plane size. Plane size (i.e., kernel size) may be dependent on the objects to be analyzed in the input data which is hard to control. It may be advantageous to design a data block having a fixed bandwidth (i.e., number of slices) associated with relatively easy-to-control dimensions such as number of channels and number of kernels meanwhile independent on the kernel size. Alternatively, when the easy-to-control dimension is the kernel size, the number of slices can also be determined based on the kernel size. In some cases, for the parameters in a convolution layer corresponding to K kernels, C channels, and P parameters in each a kernel, the number of slices can be determined by K*(C/NR), where NR is number of rows in a data block. In some cases, the number of rows is determined by the processor based on the C, K, or M. The number of slices may be determined based on a size of the chunk of data supplied to a plurality of multipliers for convolution operations in parallel. In some cases, the size of the chunk of data may be determined according to a hardware configuration. For example, when the chunk of data is a 4-row data block and the calculation circuits can take up 128 input values with each input supplied to four multipliers, the number of slices is 128/4/4=8. In this way, for each clock cycle, data arranged in all the slices at the same offset would be read into the calculation circuits simultaneously. FIG. 6 shows an exemplary arrangement of kernel parameters stored into slices within the allocated space within a contiguous region. In some cases, a size of the slice may be determined by the size of a kernel. The greater the kernel size/number of parameters, the greater the slice size. As illustrated in the figure, a convolution layer may comprise four kernels K0-K3, each kernel may comprise 2×2 parameters (i.e., R0-R1, S0-S1), and each kernel has eight channels C0-C7. The contiguous space for storing the parameters may be divided into eight slices Ps1-8. In the depicted examples, every row offset pointing to four rows and every two columns/slices may together comprise parameters corresponding to a point of a 2D plane (i.e., K0R0S0C$_i$) in a filter across eight channels. The number of slices correspond to a point may be determined by the number of channels. For example, when there are four channels, 1 slice may be enough for storing the parameters with respect to a point. In another example, when there are 16 channels, four slices may be used to store the parameters with respect to a point.

In some embodiments, parameters within a slice may be arranged such that all items stored at the same offset from starting points of the number of slices are used for the parallel operations. In this way, a chunk of parameters may be identified by indices of slices or a number of slices and offsets or a number of rows. The chunk of parameters may be supplied to a plurality of multipliers for convolution operations in parallel. The chunk of parameters may be a data block comprising one or more rows and one or more slices. In some cases, multiple rows may provide a data block for a query, and such multi-row data blocks may arrive sequentially representing one query at a time. For example, a first query may cause the first four rows and all of the eight slices from the parameters to arrive at the plurality of multipliers and a second query may cause row 5-8 to arrive at the multipliers for processing. Each parameter may be identified by a slice index and an offset. Each parameter can be any size such as 8 bit, 16 bit, 32 bit, etc. In some cases, some bytes are combined to contain the same data entry.

The input data or input feature map may be stored in a main memory or on-chip RAM in a similar way. The input feature map may be stored in a contiguous space. The contiguous space may also be divided into a number of slices. Each slice may be a contiguous space. The number of slices may be determined based on the number of channels. The number of slices may be determined based on a size of the chunk of data supplied to a plurality of multipliers for convolution operations in parallel. In some cases, the size of the chunk of data may be determined according to a hardware configuration. For example, when the chunk of data is a 4-row data block and the calculation circuits can take up 128 input values with each input supplied to four multipliers, the number of slices is 128/4/4=8. In this way, for each clock cycle, data arranged in all the slices at the same offset would be read into the calculation circuits simultaneously.

In some embodiments, the number of slices used for input features depends on how much data is processed by the computing unit per cycle. Generally, the number of slices is C*P/NR, where NR is the number of rows in the slices. In addition, the previous layer should generate output data in slices according to current layer's requirement for input data. Therefore, when the next layer has the K4C8P4 configuration, the output of current layer can write to eight slices, when the next operation has the K1C16P8 configuration, the output of current layer can write to 32 slices, and when the next operation uses K8C16P1 configuration, the output of current layer can write to four slices, as further discussed below.

FIG. 7 shows an exemplary arrangement of input features stored into slices within a contiguous region. As illustrated in the figure, the input feature map may be 4×4 (i.e., H×W) in plane dimension across eight channels C0-C7. The contiguous space for storing the parameters may be divided into eight slices Is1-8. In the depicted examples, every row offset pointing to four rows and every two columns/slices may together store parameters corresponding to a point of a 2D plane (i.e., H0W0C$_i$) in a filter across eight channels. The number of slices corresponding to a point may be determined by the number of channels. For example, when there are four channels, 1 slice may be enough for storing the parameters with respect to a point. In another example, when there are 16 channels, four slices may be used to store the parameters with respect to a point. Any number of slices may be used, depending on the hardware characteristics.

In some embodiments, input feature map within a slice may be arranged such that all items stored at the same offset from starting points of the number of slices are used for the parallel operations. In this way, a chunk of input feature map data to be identified as index of slices or number of slices and offset or number of rows. The chunk of input feature map data may be supplied to a plurality of multipliers for convolution operations in parallel. The chunk of input feature map data may be a data block comprising one or more rows and one or more slices. In some cases, multiple rows may provide a data block for a query, and such multi-row data blocks may arrive sequentially representing one query at a time. For example, a first query may cause the first four rows and all of the eight slices form the input feature map to arrive at the plurality of multipliers and a second query may cause row 5-8 to arrive at the multipliers for processing. Each input feature map data may be identified by a slice index and an offset. Each data may be any size such as 8 bit, 16 bit, 32 bit, etc. In some cases, some bytes are combined to contain the same data entry.

Figure 8:
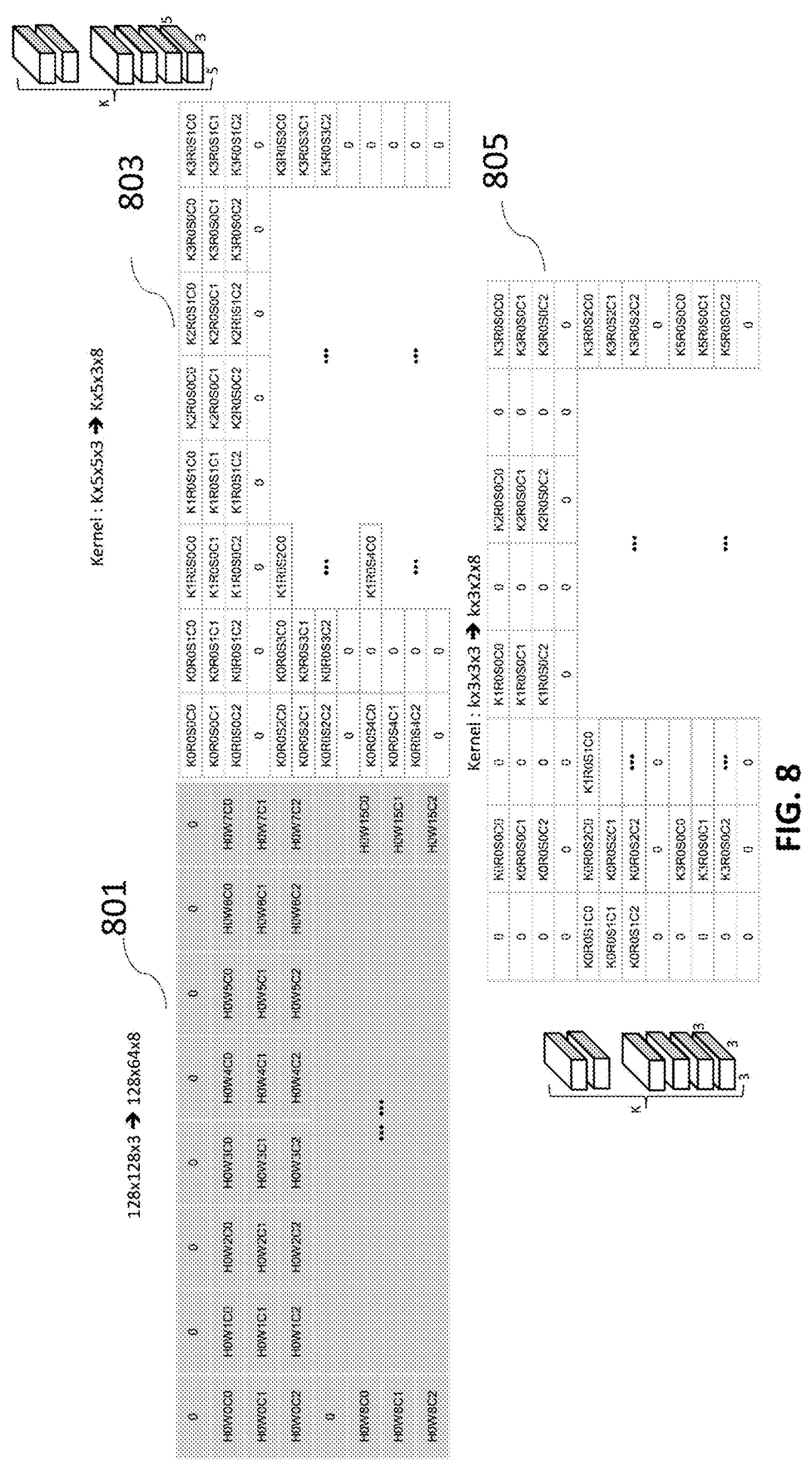

In the examples illustrated above, a pre-determined number of rows and slices may be processed using a number of multipliers concurrently. The number of rows and slices to be processed in parallel may correspond to different configurations of data storage. In some cases, when data are arranged in the same configuration, the same sets of calculation circuits and interconnect configurations can be used for performing the convolution operations. For example, it is possible to have chip designs optimized for the following CNN configurations: K4C8P4, K1C16P8, and K8C16P1. In some cases, input data or parameter data may not be aligned with a pre-determined configuration of data storage while pertaining to the channels or filter sizes. In this case, the input data or parameter data may be padded with zeros such that the data arrangement may be aligned with a pre-determined configuration of the chip. FIG. 8 illustrates examples of padding the slices to accommodate kernels of different sizes and number of channels. In the example described above, a memory access query may take up four rows and eight slices of data. In the case when the input data is image data 801 with dimension of 128×128 pixel and three channels, the input data may be padded with a row of zeros such that the input data with original dimension of 128×128×3 is transformed to 128×64×8 which is aligned with a 4-row query configuration. In the example when the parameters are from K kernels each is 5×5 in size across eight channels 803 (i.e., 5×5×3), the parameters may be arranged and padded with zeros such that the parameters data are transformed to 5×3×8 to be aligned with the 4-row query configuration. It should be noted that zeros can be placed in various locations such as to the top or bottom of the rows, or to the first or last columns so as to complete the size of the kernel to be times of 4 or complete the number of channels to be times of 4. As illustrated in another example 805, the parameters from K kernels each has 3×3 parameters across three channels (i.e., 3×3×3) are padded with zeros such that the arrangement of parameters are transformed to 3×2×8 to be aligned with a 4-row 8-slices query.

Figure 9:
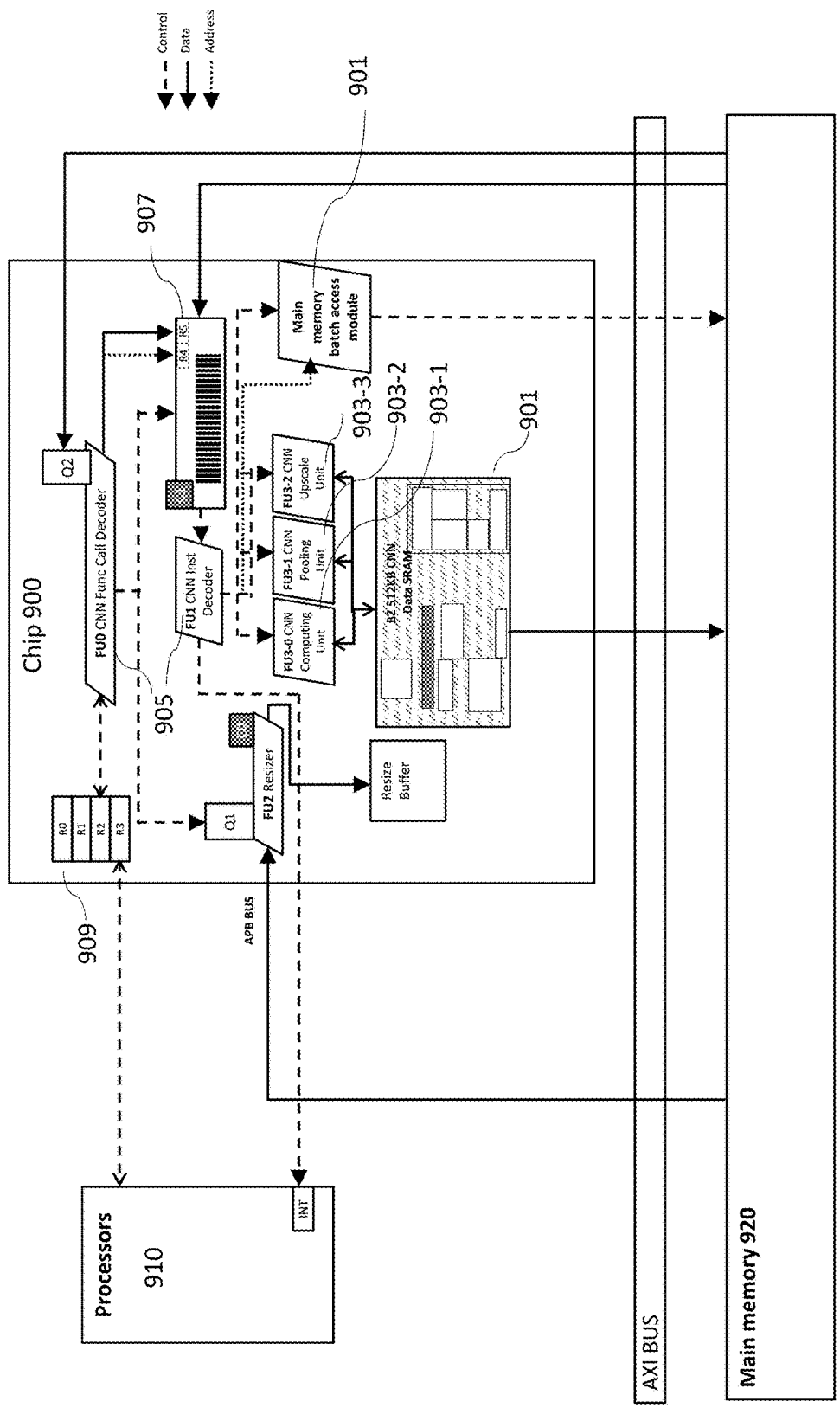
FIG. 9 illustrates an example of the chip for convolution computation, in accordance with embodiments of the invention.

In another aspect, an integrated circuit on a chip is provided for performing matrix-matrix and/or matrix-vector multiplication operations. FIG. 9 illustrates an example of the chip for convolution computation, in accordance with embodiments of the invention. A computing unit of the chip may perform a plurality of parallel operations in response to the instructions associated with the CNN model. The computing unit may comprise a plurality of calculation circuits for performing operations in CNN. The computing unit may comprise a plurality of multipliers and accumulators to perform convolutions of input values with a plurality of kernels involved in a convolution layer. The same computing unit may be used for different convolution layers. Datapaths may be controlled by one or more multiplexers to determine the input feature maps and kernels to be fetched and supplied to the computing unit. In some cases, a ReLU activation operation may be included in the convolution layer. The same set of calculation circuits can be used to perform a convolution layer with or without ReLU activation. In some cases, the convolution layer and ReLU can be performed without storing intermediate results to a memory. In some cases, the activation functions may be enabled or disabled by instructions. In some embodiments, the same set of calculation circuits can be used for different types of layers including convolution layer, pooling layer, upscale, ReLU or fully-connected layer. In some cases, different operations may share the same set of calculation circuits by using a multiplexer for controlling data paths or data flow in accordance with the operations. In some embodiments, different sets of calculation circuits may be used with respect to different layers. For example, a first set of calculation circuits may be used for convolution layer or convolution and ReLU, a second set of calculation circuits may be used for pooling and a third set of calculation circuits may be used for fully-connected layer. In some cases, different sets of calculation circuits may be determined for performing different operations in response to instructions/control signals. In the case when the same set of calculation circuits are reused for different layers of CNN, the operations may be repeated and the output feature maps of a layer may be feedback as input feature maps of the computing unit. In the case when different sets of calculation circuits are used for different layers of CNN, output results from a first set of calculation circuits corresponding to a first layer may be received as input to a second set of calculation circuits corresponding to a different layer. For instance, a second set of calculation circuits for a pooling layer may receive output results from a first set of calculation circuits for convolution and ReLU layer to perform the pooling operations, and a third set of calculation circuits for fully-connected layer may receive output from a convolution or pooling layer to perform dot product or elementwise convolutions. The results from the fully-connected layer may be used to detect patterns in the input values. The various calculation circuits may or may not be configurable in terms of calculation precision or bit depth.

The output feature map generated from each layer may be stored in the RAM to be used for next layer of operations. The output feature map may be arranged in the same manner as the input data. For instance, the output feature map may be stored into a contiguous space divided into contiguous slices. In some cases, storing the output data from each layer into different slices on the RAM may be controlled by the one or more multiplexers. For example, control signals indicative of a slice index may be used to select an output pin of the multiplexer that connects to the corresponding slice within the memory. In some cases, the space for storing the input/output feature map of previous layers may be reused for storing later generated results. The output results from hidden layers may or may not be stored after the results are used as input for a layer in the CNN. In some cases, the output results from hidden layers may be stored for one, two, three, four, five, or more layers of operations then the space for storing the results may be released and reused for later output results.

The integrated circuit can be any suitable computing platforms, microprocessors, or logic devices. The integrated circuit can be integrated to any other devices such as handheld devices, tablets, notebooks, systems-on-a-chip devices, cellular phones, internet protocol devices, digital cameras, personal digital assistants, and embedded devices such as microcontroller, digital signal processor, network computers, set-top boxes, network hubs, other smart appliances, or any other system that can perform the functions and operations described elsewhere herein. The chip can be the same integrated circuit 210 as described in FIG. 2.

The memory unit 901 may be on-board the integrated circuit. The main memory may be used for storage of data, parameters, and instructions for CNN analysis. In some cases, the main memory may also receive and store the output results of CNN. The memory unit can be any suitable RAM including static random-access memory (SRAM), dynamic random-access memory (DRAM), synchronous dynamic random-access memory (SDRAM), double data rate (DDR), double data rate synchronous dynamic random-access memory (DDR SDRAM), DDR, DDR2, DDR3, T-RAM, Z-RAM, and so forth.

The chip may comprise a computing unit 903 in data communication with the RAM. The computing unit may include a plurality of calculation components to perform different layers of CNN. In some embodiments, the plurality of calculation components may be adapted for requirements of different layers of CNN. For example, the plurality of calculation components may be used for performing the convolution operations in the convolution layer, average or max operations for the pooling layer, and/or dot product operations in the fully-connected layer. In some cases, configuration of the computing unit may be controlled through interconnections among a plurality of calculation circuits.

The computing unit may comprise arrays of calculation circuits. The calculation circuits may include arithmetic logic units (ALUs). The ALUs may be in the arrays that are connected via a network which may depend on the dataflow requirements. In some cases, the computing unit may be in the form of fine-gained spatial architectures such as FPGA. Other architectures such as application-specific integrated circuit (ASIC) can also be used. In some cases, the calculation circuits may comprise a plurality of multipliers. In some cases, the calculation circuits may comprise a plurality of multiplier-accumulator units (MACs). The computing unit may include an ALU datapath which is capable of performing multiplications followed by addition/accumulations. In some cases, a FIFO may be used to control the traffic going in and out of the computing unit. The computing unit may comprise a plurality of multipliers and accumulators. For example, the computing unit may comprise 32, 64, 128, or 256 multipliers.

Each multiplier may include a first input to receive a value of an input signal and a second input to receive a weight or kernel parameter. Multipliers may be hardware components that perform multiplication operation of integer or fixed-point inputs. The multipliers may be for example 8-bit or 16 bit fixed-point multipliers. The accumulators may include one or more adders for summing products from outputs of multipliers. The adders may be multiple input adders. For example, the adders may be 4-input adders.

In some embodiments the same computing unit may be used to perform convolution, average, maximum value, or dot-product operations without changing the components and interconnections. In some embodiments, different calculation circuits may be used for different types of layers. For example, as illustrated in the figure, the computing unit may comprise different function units. The different function units may include at least a convolution unit 903-1, a pooling unit 903-2, and an upscale unit 903-3. In some cases, each function unit may be implemented using different sets of calculation circuits. Alternatively, two or more of the function units share the same set of calculation circuits.

In some cases, rectifiers may be combined with convolution layers and the output results from the computing unit may be the convolution results processed by activation function. As described elsewhere herein, various activation functions can be used. In some cases, a rectified linear unit (ReLU) activation function may be used. The ReLU layer may apply an elementwise activation function, such as the max(0,x) thresholding at zero. The function can be implemented by various components such as by multiplexers. For example, a rectified linear unit as the activation function, which can be implemented with a 2-to-1 multiplexer that selects between the original value or zero, based on the sign bit of the input.

In some cases, the computing unit may also be capable of processing pooling layer together with a convolution layer. Pooling operation reduces the input dimensionality by extracting the maximum/average value from a set of neighboring inputs. The pooling may be maximum pooling or average pooling. In max pooling operations, the input feature map may be partitioned into a set of non-overlapping rectangles and, for each such sub-region, outputs the maximum value. In another example, in an average pooling, an average value of a sub-region may be output. The input feature map can be partitioned by any size. For example, pooling may be applied with filters of size 2×2 applied with a stride of 2 at every depth slice. A pooling layer of size 2×2 with stride of 2 shrinks the input image to a ¼ of its original size. The pooling operations can be implemented using various logic components. For example, MAX comparison function unit may be connected to each of the accumulator that outputs the convolution result or the rectifier for extracting the maximum value across several output results according to the pooling window size. In some cases, a temporary story may be used for storing the intermediate results for the maximum pooing process. In another example, outputs from convolution calculation circuits (i.e., adders or ReLU) may be pipeline into average calculation circuits without using temporary storage for intermediate outputs. In this way, convolution and average pooling layers may be built as a pipeline.

In some cases, upscale layer may also be operated with convolution layer. Upscaling operations may increase resolution of a feature map by suitable method such as interpolation. Upscaling operations may be implemented using various logic elements such as adders, accumulators, comparators, interpolator, or average, etc.

The various operations convolution, pooling, upscaling, ReLU activation can be performed individually or collectively using the same sets of calculation circuits or different sets of calculation circuits. Various combinations may be performed by the computing unit with the input feature map, parameters and output results arranged in the way as provided by this disclosure. Using the provided method and system, operations of the various combinations may require reduced or without memory access for storing intermediate results. The different operations can be combined in various ways such as a combination of convolution and ReLU, a combination of convolution, ReLU and pooling, a combination of convolution, ReLU and upscaling, and so forth.

The integrated circuit may further comprise other components for various internal communications on chip and communications between an external memory and the chip. The components may include buffers for efficient reuse of input or intermediate data. In some embodiments, the Resize Buffer is approximately 24 KB. In general, the size of the buffer can be in any range, such as from 100 kB to 500 kB.

As mentioned above, the control signals input to the multiplexers may be decoded by one or more instruction decoders 905. The instruction decoders may decode instructions, and generate as an output one or more micro-operations, micro-code entry points, microinstructions, control signals for the multiplexers, other instructions or other control signals, which are decoded from, or which otherwise reflect, or are derived from, the original instructions. For example, the CNN functional call decoder may decode a functional call into a sequence of microinstructions and the CNN instruction decoder may decode the sequence of microinstructions into control signals. The decoder can be implemented using various suitable mechanisms. For example, the decoder can be implemented using look-up tables, hardware implementations, programmable logic arrays (PLAs), microcode read only memories (ROMs), and the like. The decoder may be coupled to the one or more multiplexers and connected to a main memory storing instructions via FIFO 907. In some cases, the decoder may be configured to decode instructions stored in one or more instruction registers.

The integrated circuitries may also comprise one or more registers 909. A register may hold an instruction, a storage address, interrupt number, or any kind of data (such as a bit sequence or individual characters). For example, registers R0-R3 are for CNN functional call queue maintain that stores a start, length, head and tail of the functional call queue, and register R4 is used to hold a base address for DDR main memory access. Some registers are used for indication of status. For example, when the CNN operations are done, the register may be set to indicate the status of CNN results is ready. For instance, registers R4 and R5 may be used for storing an interrupt number indicative of finish of a CNN process. The value in R4 and R5 may be specified by instructions.

Some instructions specify registers as part of the instruction. For example, an instruction may specify that the contents of two defined registers be added together and then placed in a specified register. In another example, the instructions may be encoded and fetched from a main memory. A register may have various sizes, for example, a register may be 64 bits in length for holding long instructions or half-registers for shorter instructions. The one or more registers may contain multiple index registers, also known as address registers or registers of modification. The effective address of any entity in the integrated circuit includes the base, index, and relative addresses, all of which can be stored in the index register. The one or more registers may include shift registers, typically a cascade of flip flops The one or more registers may store one or more different data types, such as scalar integer, scalar floating point, packed integer, packed floating point, vector integer, vector floating point, status (e.g., an instruction pointer that is the address of the next instruction to be executed), and so forth.

The integrated circuits may comprise various other computer components to facilitate communication with an external processor or memory. The communication modules (e.g., main memory batch access module 901) may include suitable means for instruction and data transfer such as double data rate. Various means can be employed for communication such as peripheral component interconnect card, computer buses including but not limited to PCI express, PCI-X, HyperTransport, and so forth. Suitable communication means may be selected according to the requirements of the bandwidth and compatibility of the integrated circuits. For example, one data bus may be for command transfer (e.g., AXI4lite bus) and a different data bus (e.g., AXI4 bus) may be used for data transfer and the CNN integrated circuit may work as an IP on the AXI4 bus. The integrated circuit receives commands and parameters from the main memory 920 through the data bus (e.g., AXI4lite bus) and communicates with main memory batch access module 901 through FIFO interfaces. This main memory batch access module can access external memory through the data bus. In some cases, interruption mechanism may be enabled between the integrated circuit and an external processor 910 to provide an accurate time measurement.

The integrated circuits comprise one or more multiplexers. The one or more multiplexers may be connected with the plurality of multipliers and other computing circuits. The multiplexers may be configured to realize functions at different levels in accordance with the control signals. For example, multiplexers at a first level may be configured to select different address space (including feature, weight, bias, output of the instruction) in the RAM, a second level multiplexer is to determine which data from the RAM within an address space (which contiguous region, which space for a layer, which slice within the space, etc.) will be mapped to which MAC, a third level is used to select specific MAC results for storage in the RAM, and a fourth level is used to determine where within an address space (which contiguous region, which space for a layer, which slice within the space, etc.) the result of a single MAC is to be stored. Each multiplexer may include multiple input selector pins for n inputs and output 1 selected input. A multiplexer could be any size of n-to-1 where n can be 2, 4, 8, 16, 32, and so on. In some cases, a small number of large multiplexers may be used. In some cases, a large number of small multiplexers may be used. In some cases, multiplexers may be chained together to construct a large multiplexer.

Figure 10:
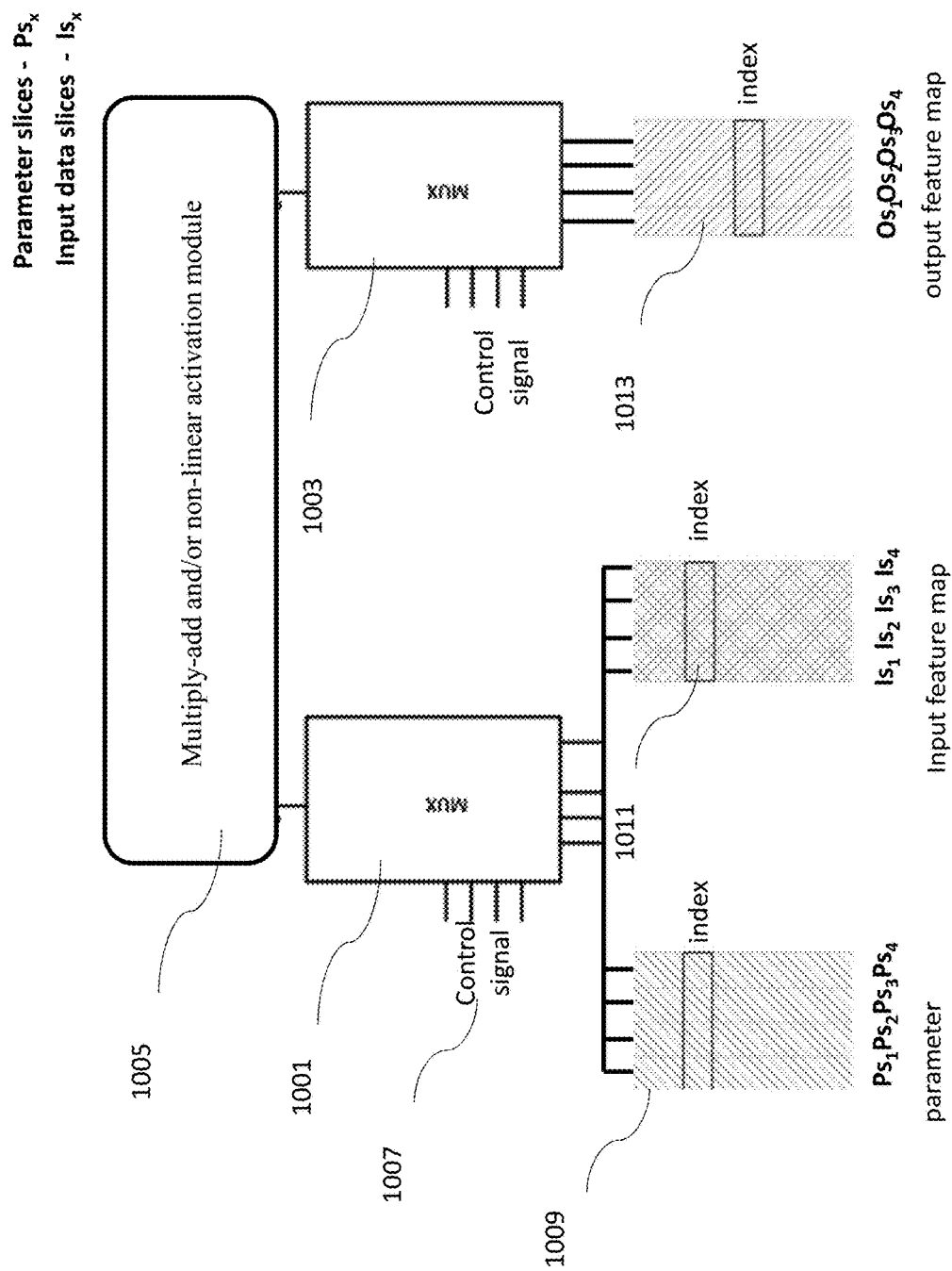
FIG. 10 illustrates that multiplexers facilitate implementation of a distinct memory access pattern in convolution computation on the chip.

FIG. 10 illustrates that multiplexers facilitate implementation of a distinct memory access pattern in convolution computation on the chip. The one or more multiplexers 1001 may receive a set of control signals 1007 to select one of a predetermined plurality of routes for transmitting data to one of the plurality of multipliers. The control signals may be decoded from various commands for the multiplexers. These control signals include activation function enablement, and also the input source selection for computation, either from the image buffer or from the output of the previous layer, selection of parameters, biases, input feature maps address (i.e., slice index, offset in slice), size of parameters or input data and so forth. In one example, the control signals may determine one of a predetermined plurality of routes for transmitting the subset of the set of parameters or input feature map data to the plurality of multipliers. The control signals may be decoded from data transfer instructions or convolution operation instructions that comprise data address such as slice index, offset within a slice, number of slices or number of rows.

In some cases, the interconnections or data transmission routes between the multiple multipliers and multiple adders/accumulators may be controlled by one or more multiplexers. For example, the one or more multiplexers may be connected to the multiple inputs of the multipliers so as to select the data supplied to the multipliers. In some cases, the one or more multiplexers may be connected to a plurality of adders or accumulators for summing products produced by a plurality of multipliers. The one or more multiplexers may receive control signals for determining a data transfer route for transmitting items produced by the plurality of multipliers to one or more of the plurality of adders. In yet another example, one or more rectifiers may be connected to one or more outputs of the multiple accumulators for ReLU operations. One or more multiplexers may be connected to the rectifiers and based on the control signals effect enablement or disablement of the one or more rectifiers.

As illustrated in the figure, one or more multiplexers 1001 may be configured to retrieve parameters and input feature map data from the on-chip RAM. In some cases, the parameters, bias and input feature maps may be stored in separate contiguous spaces within the RAM 1009, 1011, 1013. Although the memory space 1009 and 1013 are illustrated as separate, the memory space 1009 for the input feature maps may be reused for the output feature maps and vice versa. In some cases, the input data may be stored in a buffer while the parameters and bias are stored in the RAM. The one or more multiplexers 1001 may receive a set of control signals to determine which address space to fetch the parameters, bias and/or input data/input feature map. In some embodiments, additional multiplexer(s) 1001 may be used to further determine which data within the address space should be supplied to which multiplier within a computing unit 1005. The additional multiplexer(s) may be connected to a plurality of multipliers. The multiplexer(s) may be directly connected to the multipliers.

One or more multiplexers 1003 may be included for determining how the output feature map or output results from the computing unit 1005 should be stored in the RAM 1013. The multiplexers may receive control signals determining one of a plurality of a predetermine routes for transmitting items produced by the rectifiers to one slice in the RAM or to one offset within the slices. The one or more multiplexers may store the output feature map in a way similar to the input feature map such that the output results can be used as input feature map for the next CNN layer. For example, the multiplexer(s) may determine in which RAM slices or at which offset within the slices the result of a single MAC will be stored. In some cases, one multiplexers 1003 may take one data input and a number of selection inputs, and they have several outputs which correspond to several memory addresses (e.g., a slice index or an offset). They forward the data input to the location where one of the outputs is to be stored depending on the values of the selection inputs. The one or more multiplexers may be connected to a plurality of accumulators/adders, and/or a plurality of rectifiers (depending on whether rectifiers are included).

The computing unit may be implemented using a plurality of multiplexers, multipliers, adders/accumulators, and/or other elements such as splitters or delay elements. The computing unit can be implemented with various configurations. The various calculation circuits may be interconnected in various different ways. The configurations of the calculation circuits are be advantageous to allow for an efficient utilization of the plurality of calculation circuits while adaptation to different input data/parameters layouts. In some cases, the configurations may allow the computing unit to operate convolutions by fully utilizing the multipliers so as to improve the efficiency of multiplication operations.

Figure 11:
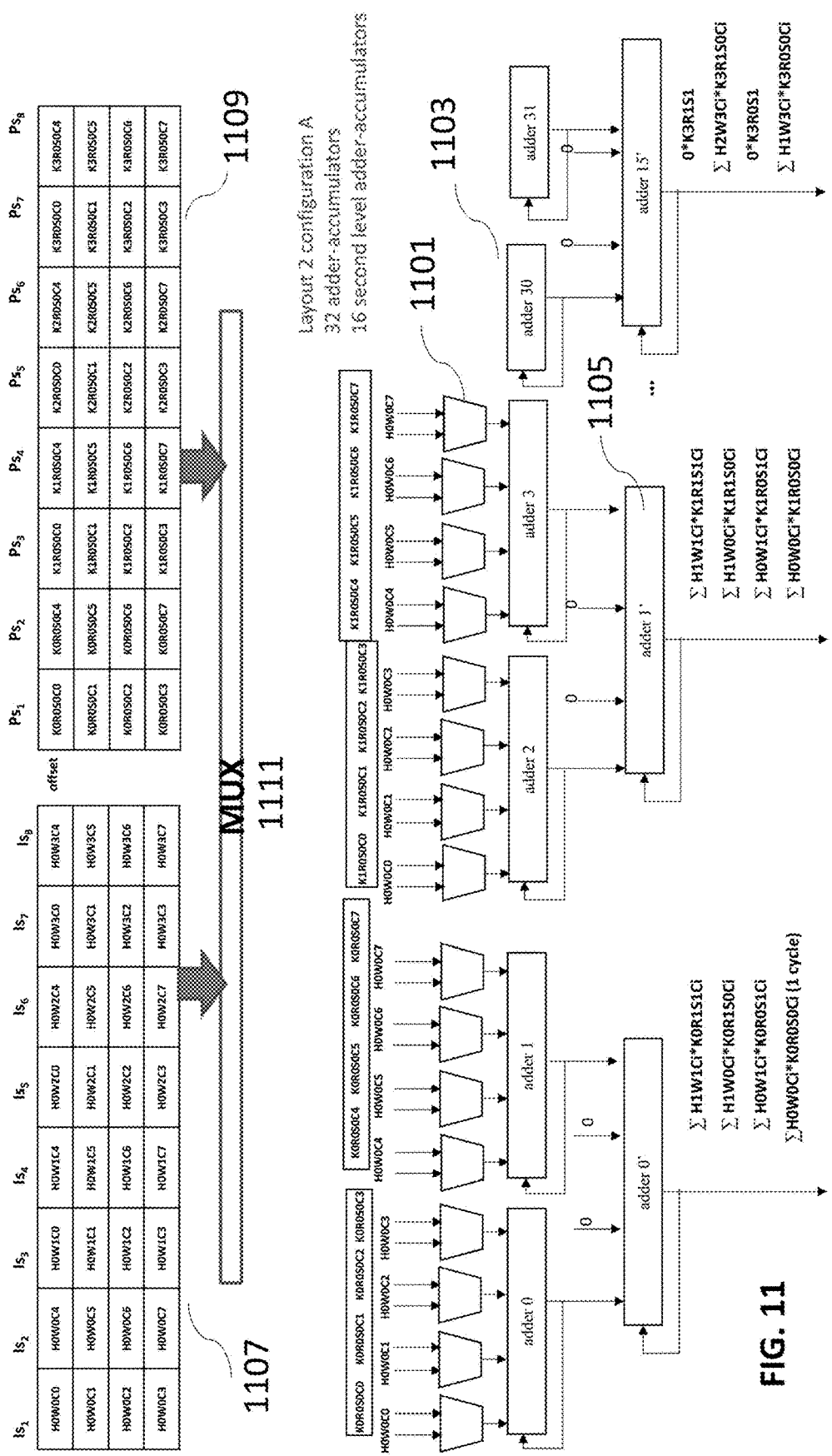
FIG. 11 illustrates an exemplary configuration which can be adapted for different convolution layers.
Figure 12A:
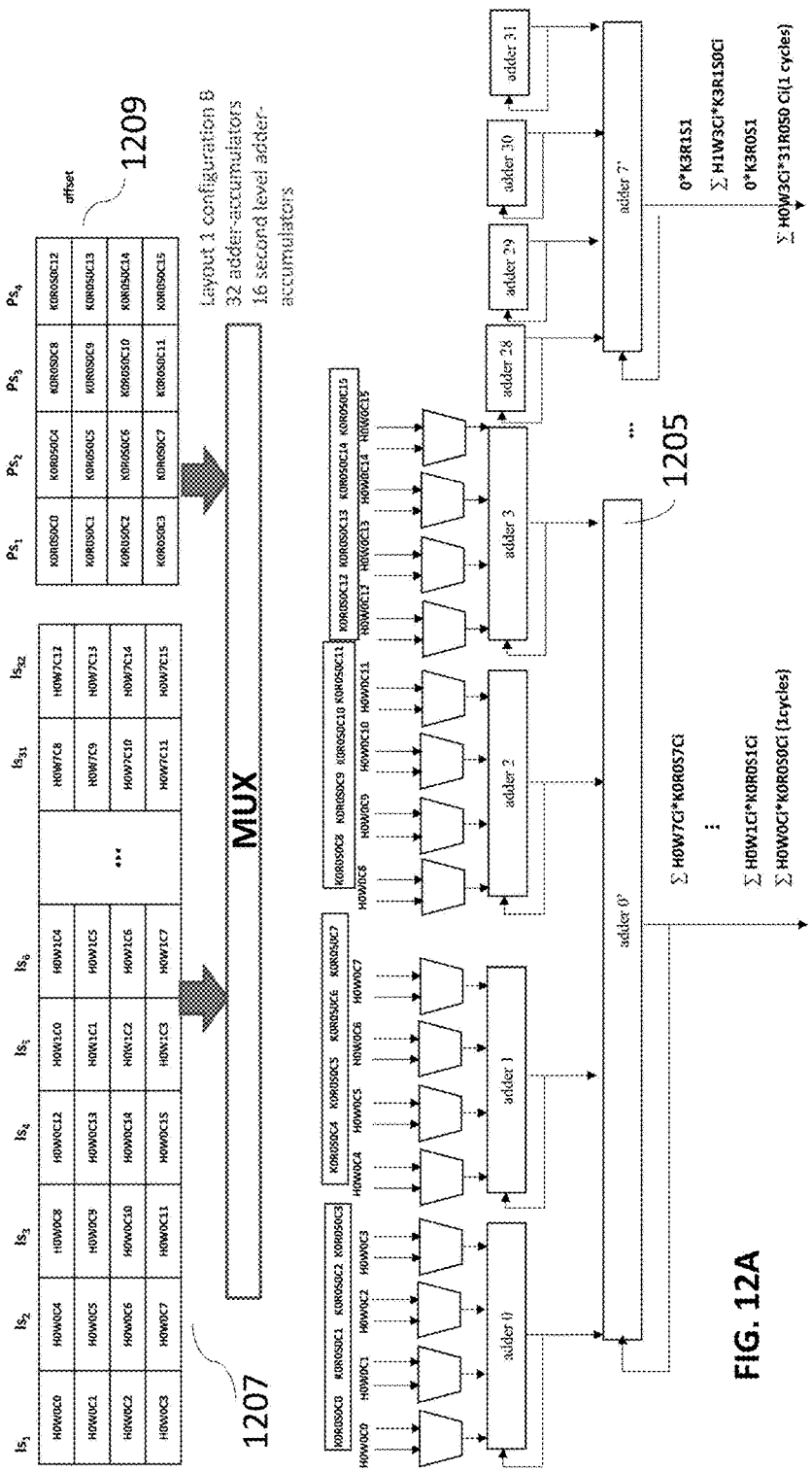
FIG. 12A illustrates another exemplary configuration which can be adapted for different convolution layers.
Figure 12B:
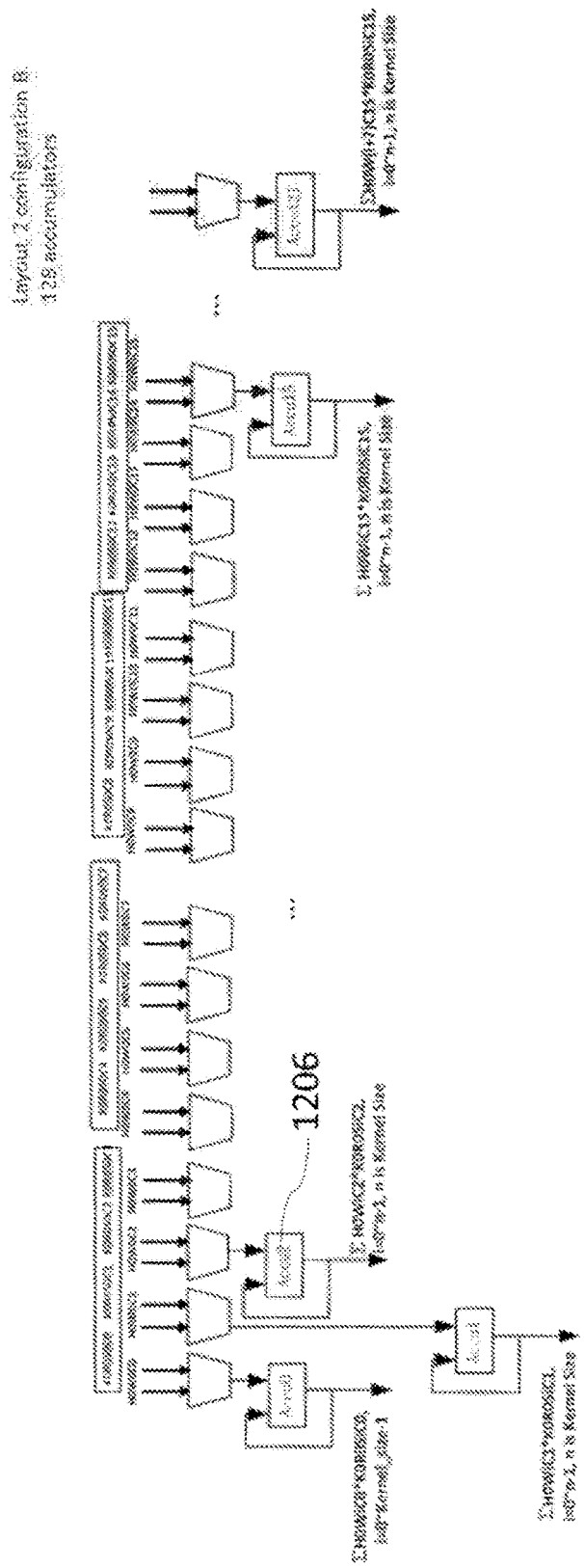
FIG. 12B illustrates another exemplary configuration which can be adapted for different convolution layers.
Figure 13:
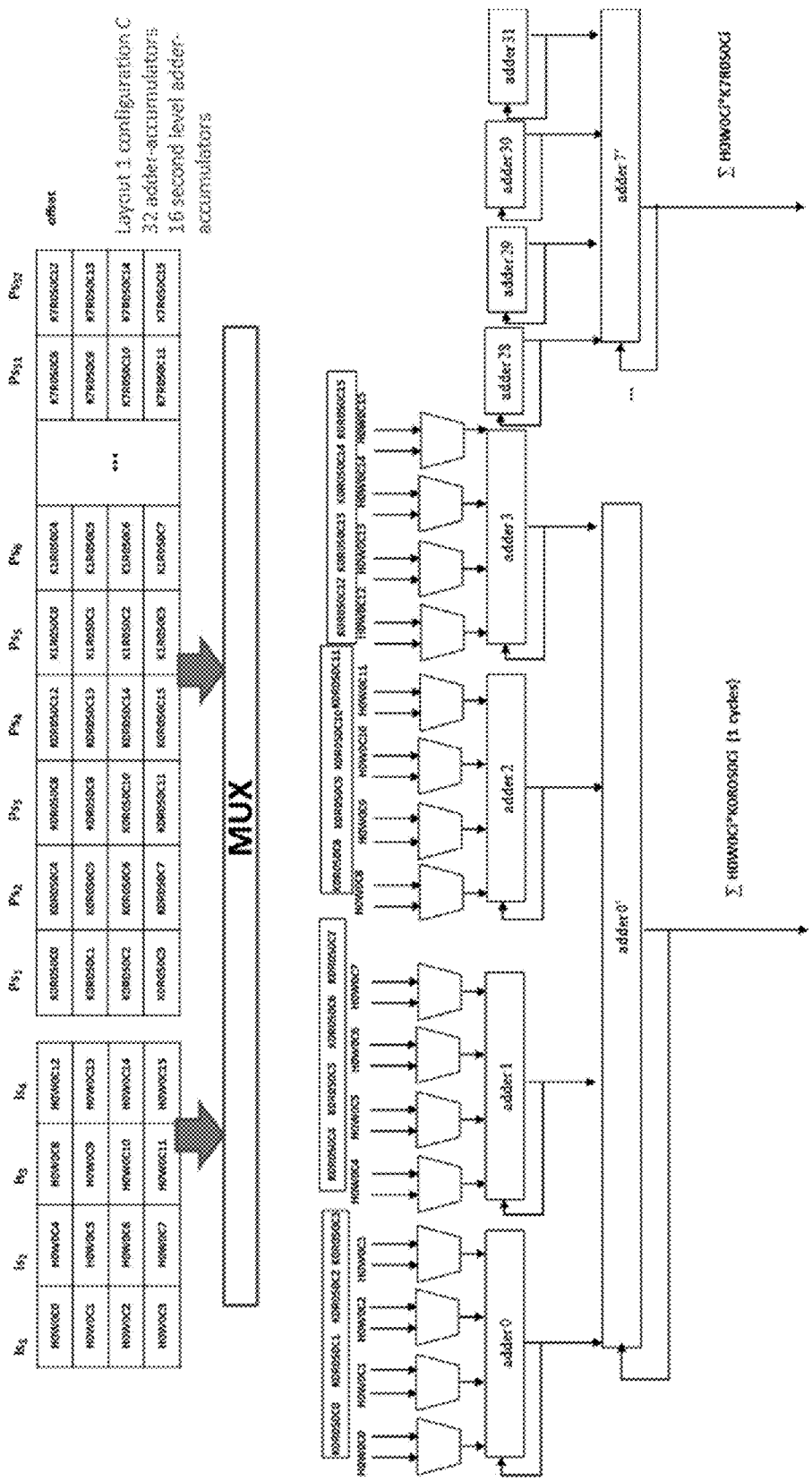
FIG. 13 illustrates yet another exemplary configuration which can be adapted for different convolution layers.

In some cases, the configuration of the calculation circuits is independent of a kernel size. Alternatively, the configuration of the calculation circuits can be independent of other parameter dimension. FIGS. 11-13 illustrate exemplary configurations which can be adapted for different convolution layers. In some cases, the convolution layer may comprise a depthwise separable convolution layer. The convolution layer can be a depthwise convolution layer or a pointwise convolution layer. It should be noted that the number of multipliers and adders are for illustrative purpose only, any number of multipliers (e.g., 32, 64, 128, 256, 512, etc.) and any number of adders can be utilized in the computing unit.

As shown in FIG. 11, the computing unit may comprise 128 multipliers 1101 connected to a plurality of adders 1103 for convolution operations. In some cases, the plurality of adders may form a two-level adder network. The same computing unit configuration may be used for processing input feature map and parameters with variable sizes such as different number of channels and/or different kernel sizes. One or more multiplexers 1111 may receive control signals for controlling data transmission routes. The data transmission routes may include fetching data from an on-chip RAM to the computing units. In some cases, the data transmission routes may also include interconnections between the multipliers and adders. In each cycle, the computing unit may be able to handle a plurality of input values in parallel. In the depicted example, the computing unit may be capable of handling 128 input feature map data and 128 parameters in parallel. The 128 multipliers may be configured to perform multiplication in parallel and each of the plurality of accumulators 1103 may sum the outputs of four multipliers and accumulate the partial sum results for one or more cycles. Then the accumulated partial results may further be summed and accumulated by one or more accumulators to yield a final output of a convolution layer. In some cases, no buffer storage is required by the dataflow. In some cases, buffer or memory space on RAM may be used for storing intermediate results, and the number of accessing the memory or buffer may be reduced.

In the example illustrated in FIG. 11, the input feature map may have eight channels, as further illustrated in FIG. 6. In each cycle, a portion of the input features as stored in four rows and eight slices 1107 are used. The parameters for one layer include four kernels each having 2×2 parameters across eight channels, as further illustrated in FIG. 7. In each cycle, a portion of the parameters as stored in four rows and eight slices 1109 are used. In some cases, in each cycle, 1 point of a kernel across all channels of all filters are used, multiply with four points in the input feature map The input features in 1107 and the parameters in 1109 may be fetched and supplied to the 128 multipliers with each parameter feeding into four multipliers. Each of the multipliers may include a first input to receive a value of the input data and a second input to receive a kernel parameter/weight. The multipliers may perform multiplication operation of integer or fixed-point inputs. For example, the multiplier may be 8-bit fixed-point multipliers. A first level adder or accumulator such as adder 0 may be used for summing products from outputs of multipliers 1-4. The adder/accumulator may be 4-input adder/accumulator.

Specifically, the input features H0W0C0-7 may be supplied to a first input of each of the first eight multipliers, and the parameters K0R0S0C0-7 may be supplied to the second input of the first eight multipliers. A network of adders/accumulators may include two first-level adders (e.g., adder 0 and adder 1) each for summing the outputs from the first and second set of multipliers, and a second-level accumulator 1105 (e.g., adder 0') for summing the outputs from the two first-level adders. The second-level accumulator can have multiple inputs. The multiple inputs can be selectively controlled such the same chip layout can be adapted for different configurations. For instance, in the depicted example where the input feature map has eight channels, two of the four inputs are fed with zeros for summing an adjacent eight multipliers' products. The same layout can also be used for a 16 channels input feature map by summing an adjacent 16 multipliers' products. In some cases, the adders/accumulators are running in parallel with the multipliers, thus the result of the adder 0' after the first clock cycle is the convolution of the first point of the input feature map with the first point of a kernel across eight channels. In the next clock cycle, the results of the adder 0' would be $\Sigma H0W1Ci*K0R0S1Ci$ for i=0-7. Alternatively, the adders/accumulators operating in a following clock cycle thus it may take three clock cycles (e.g., one for multiplication and two for the two-level additions) for outputting the convolution of the first point. The number of multiplications is determined by the kernel size. In the example, after at least four cycles, convolution output data such as one point for one channel in the output feature map may be obtained. Similarly, the second set of eight multipliers and two first-level and a second-level accumulators may be used for generating second convolution output data such as one point for one channel in the output feature map with respect to the second kernel K2. The output data point may be saved in a temporary memory and when the calculations are done for the entire layer, the accumulations results may be stored to the space within the RAM where the input feature maps were stored. In the exemplary configuration, two first-level accumulators and one second-level accumulators are used for summing the multiplication results produced by eight multipliers over at least four clock cycles to generate an output result. The number of clock cycles may be determined by the number of kernel parameters/kernel size. In some cases, rectifiers may be connected to the outputs of the accumulators to further activate the output features. In this case, additional clock cycles may be required for ReLU operations.

In some cases, after a batch of the input feature map data or data block (e.g., eight slices by four rows) are finished with processing, the offset may be increased by the data block size (e.g., four rows) and the next batch of data are fetched to the computing unit repeatedly until all of the parameters and input feature map are processed for a layer of operation. In some cases, no temporary memory access is required for storing the intermediate results during processing of the data block. In some cases, intermediate results may be generated and stored in a temporary memory (e.g., registers, buffer on chip, buffer on the main memory) for further processing in later clock cycles. In some cases, after a batch of the input data are processed, data stored in the one or more accumulators may be cleared.

After a layer of operation is finished, input feature map data and parameters may be reloaded to the space 1009 and 1011. For example, the parameters may be loaded from the contiguous space where the CNN is stored and the input feature map may be loaded from the contiguous space where the output data from the previous layer is stored. After a layer of operation is finished, the output feature map of a layer may be stored in the RAM for one or more layers of operations then the memory space for storing the output feature map may be released for reuse.

In some cases, after all the CNN operations are done, an interrupt control signal may be generated by a decoder and sent to the main memory batch access module to trigger transmitting the output data from the RAM to the main memory. In some cases, the output results of a CNN system may be a classification score vector. The output results may be stored and/or presented to a user via a computer system coupled to the main memory. The classification results can be used in various ways and applied to various applications. For example, the output results can be displayed on a display device to a user or used to generate control signals or instructions for controlling another device.

In some cases, multiplexers may be used to control the dataflow or data routes between the multipliers and adders/accumulators. For instance, the same 4-input second-level accumulators may be used for different hardware configurations, and in the first examples as illustrated in FIG. 11, two out of four inputs may be selected for summing the results from the first-level accumulators. The selective input to adders/accumulators may be achieved by control signals that control multiplexers.

The input feature map and parameters may have variable sizes and dimensions. The input feature map and parameters may be arranged into a number of slices where the number of slices for the input feature map may or may not equal to the number of slices for the parameters. In another example illustrated in FIG. 12A, the same computing unit configuration may be used for processing input feature map and parameters with different number of channels from the previous example, and the same configuration is also adapted for various kernel sizes or shapes. In some cases, the input feature map may have a large number of channels and the number of kernels may be small. For example, the input feature map may have 16 channels and arranged into 32 slices 1207. The input feature map may be convolved with one kernel containing eight parameters across 16 channels. The kernel shape can be 1×8, 8×1, 2×4 or 4×2. The parameters may be arranged into four slices 1209. In a clock cycle, four rows and 32 slices of the input feature map and four slices of parameters may be fetched and supplied to the 128 multipliers with each parameter feeding into eight multipliers (e.g., multipliers 0, 16, 32, 48, 64, 80, 96, 112) and each input value feeding into one multiplier. A first level adder or accumulator such as adder 0 may be used for summing products from outputs of multipliers 1-4. The adder/accumulator can be 4-input adder/accumulator. The multiplier, adders and the interconnection between the multipliers and adders can be same as illustrated in FIG. 11. Similarly to the previous example, the input feature map data and the parameters data as stored in the data block 1207 and 1209 may be processed using one clock cycle.

Specifically, 16 input values H0W0C0-15 may be supplied to the first input pins of the first 16 multipliers, and 16 parameters K0R0S0C0-15 may be supplied to the second input pins of the 16 multipliers. The network of adders/accumulators may include four first-level adders (e.g., adder 0 and adder 1) each for summing the outputs from the four sets of multipliers, and a second-level accumulator 1205 (e.g., adder 0') for summing the outputs from the four first-level adders. The result of the adder 0' after the first clock cycle is the convolution of the first point of the input feature map with the first point of a kernel across 16 channels. In the next clock cycle, the results of the adder 0' would be $\Sigma H0W1Ci*K0R0S1Ci$ for i=0-15. The number of multiplication is determined by the kernel size. In the depicted example, because the kernel contains eight parameters, the second level adder such as adder 0' may accumulate products from adder 0 and adder 1 for eight cycles in order to output a convolution result. The convolution operations will be applied across the entire input feature map. For example, after at least eight cycles, eight convolution output results may be obtained from the eight second-level adders 0'-7'. The output data point may be saved in a temporary memory and when the calculations are done for the entire layer, the accumulations results may be stored to the space within the RAM where the input feature maps were stored. In the exemplary configuration, four first-level accumulators and one second-level accumulators are used for summing the multiplication results produced by 16 multipliers over at least eight clock cycles to generate a point having 16 channels in an output map. The number of clock cycles for producing one output result may be determined by the number of kernel parameters/kernel size.

In some cases, the same configurations can be adapted for a depthwise convolution layer. Alternatively, a variation of configuration may be used for the depthwise convolution layer. The depthwise convolution layer as mentioned above may produce a convolution for each input channel. In the example illustrated in FIG. 12B, a variation of computing unit configuration from the previous example may be used for processing input feature map and parameters with the same number of channels from the previous example, and the same configuration is adapted for various kernel sizes or shapes. For example, the input feature map may have 16 channels and arranged into 32 slices. The input feature map may be convolved with one kernel containing eight parameters for each channel. The kernel shape can be 1×8, 8×1, 2×4 or 4×2. The parameters may be arranged into four slices in the same manner as shown in the previous example. In a clock cycle, four rows and 32 slices of the input feature map and four slices of parameters may be fetched and supplied to the 128 multipliers with each parameter feeding into eight multipliers (e.g., multipliers 0, 16, 32, 48, 64, 80, 96, 112) and each input value feeding into one multiplier. An accumulator such as Accu2 1206 may be used for summing products from outputs of multiplier 2. The configuration may comprise 128 accumulators each of which is configured to sum products from a multiplier. The sum result produced by each accumulator is a convolution result of a filter applied to a channel of the input feature map.

Specifically, the result of the Accu0 after a clock cycle is the convolution of the first channel of the input feature map with the first channel of a kernel (i.e., a first kernel) across a row of the kernel. In the next clock cycle, the results of the Accu0 would be H0W1C0*K0R1S1C0 for i=0-15. The number of multiplication is determined by the kernel size. In the depicted example, because the kernel contains eight parameters, the Accu0 may sum up across the entire kernel for 8 cycles in order to output a convolution result. The convolution operations will be applied across the entire input feature map. The output data point may be saved in a temporary memory and when the calculations are done for the entire layer, the accumulations results may be stored to the space within the RAM where the input feature maps were stored. In the exemplary configuration, 128 accumulators are used for summing the multiplication results produced by 16 multipliers to generate a point for one channel in an output map. The number of clock cycles for producing one output result may be determined by the number of kernel parameters/kernel size. The output of the depthwise convolution layer may be supplied to a ReLU layer followed by a 1×1 pointwise convolution layer.

FIG. 13 shows another example of using the same configuration to perform convolutions for another layout of the input feature map and kernels. In some cases, the input feature map may be small in size and the number of kernels may be large. The input feature map may be arranged and stored into four slices. The parameters may be arranged into 32 slices. The input feature map may have 16 channels and arranged into four slices. The input feature map may be convolved with 7 kernels each of which contains one parameter across 16 channels. The parameters may be arranged into four slices. In a clock cycle, four rows and four slices of the input feature map and 32 slices of parameters may be fetched and supplied to the 128 multipliers with each input value feeding into 8 multipliers (e.g., multipliers 0, 16, 32, 48, 64, 80, 96, 112) and each parameter feeding into one multiplier. Each of the multipliers may include a first input to receive a value of the input value and a second input to receive a kernel parameter/weight. The multipliers may perform multiplication operation of integer or fixed-point inputs. For example, the multiplier may be 8-bit fixed-point multipliers. A first level adder or accumulator such as adder 0 may be used for summing products from outputs of multipliers 1-4. The adder/accumulator may be 4-input adder/accumulator. The multiplier, adders and the interconnection between the multipliers and adders can be same as illustrated in FIG. 11 and FIG. 12A.

Specifically, 16 input values H0W0C0-15 may be supplied to the first input pins of each of the first 16 multipliers, and 16 parameters K0R0S0C0-15 may be supplied to the second input pins of the 16 multipliers. The network of adders/accumulators may include four first-level adders (e.g., adder 0 and adder 1) each for summing the outputs from the four sets of multipliers, and a second-level accumulator (e.g., adder 0') for summing the outputs from the four first-level adders. The result of the adder 0' after the first clock cycle is the convolution of the first point of the input feature map with the first point of the kernel across 16 channels. In the next clock cycle, the results of the adder 0' would be ΣH0W1Ci*K0R0S1Ci for i=0-15. The number of multiplication is determined by the kernel size. In the depicted example, because the kernel contains only one parameter, each cycle the second level adder such as adder 0' will output a convolution result. The convolution operations will be applied across the entire input feature map until finish. For example, after at least one cycle, eight convolution output results may be obtained from the eight second-level adders 0'-7'. The output data point may be saved in a temporary memory and when the calculations are done for the entire layer, the accumulations results may be stored to the space within the RAM where the input feature maps were stored. In the exemplary configuration, four first-level accumulators and one second-level accumulators are used for summing the multiplication results produced by 16 multipliers over at least one clock cycle to generate a point having 16 channels in an output map. The number of clock cycles for producing one output result may be determined by the number of kernel parameters/kernel size.

Figure 14:
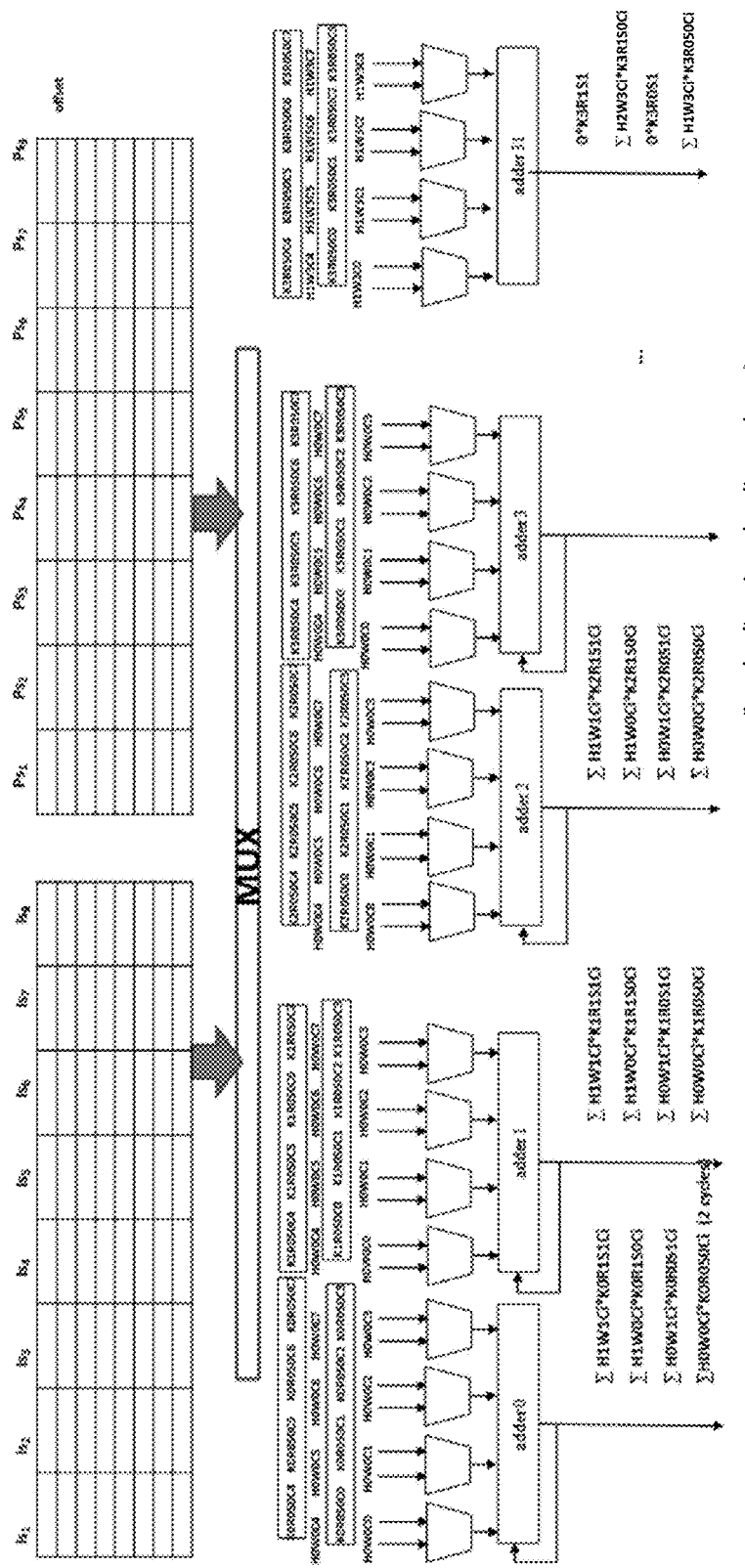
FIG. 14 shows an exemplary configuration of computing unit.

In some embodiments, only one level of adders/accumulators may be used. As a variation example of the configuration as illustrated in FIG. 14, the computing unit may comprise 32 accumulators each connected with four multipliers without second-level accumulators. Every four multipliers (e.g., first four multipliers) may be used to perform multiplication of a 2×2 region of the input feature map and the kernel and the products are summed and accumulated by an adder/accumulator (e.g., adder 0). Multiple cycles clocks may be required to generate one output result. The number of cycles may be determined by the kernel size and the number of channels. For instance, in the depicted example, since the kernel size is 4 and the convolution is applied to eight channels, the total number of clock cycles to generate one output is 8 cycles=2 (cycles for one parameter across eight channels)×4 (parameters). It may take at least eight cycles to process input feature map data stored in a data block containing eight slices and eight rows. It should be noted that the configuration as shown in FIG. 14 may or may not be the same configuration of FIG. 11. In some cases, the second-level accumulators as used in FIG. 11 may be disabled by one or more multiplexers such that the two configurations would be the same.

In some embodiments, 32 four-input adders receive outputs of the 128 multipliers, and another 16 two-input adders then receive outputs of the 32 four-input adders. The outputs of the 16 two0input adders are then stored into the RAM. This layout could suffice for the CNN configuration K4C8P4. For CNN configurations K1C16P8 or K8C16P1, the 16 outputs of the 16 two-input adders are further fed to eight two-input adders, and the 8 outputs of the eight two-input adders are stored into the RAM.

Figure 15:
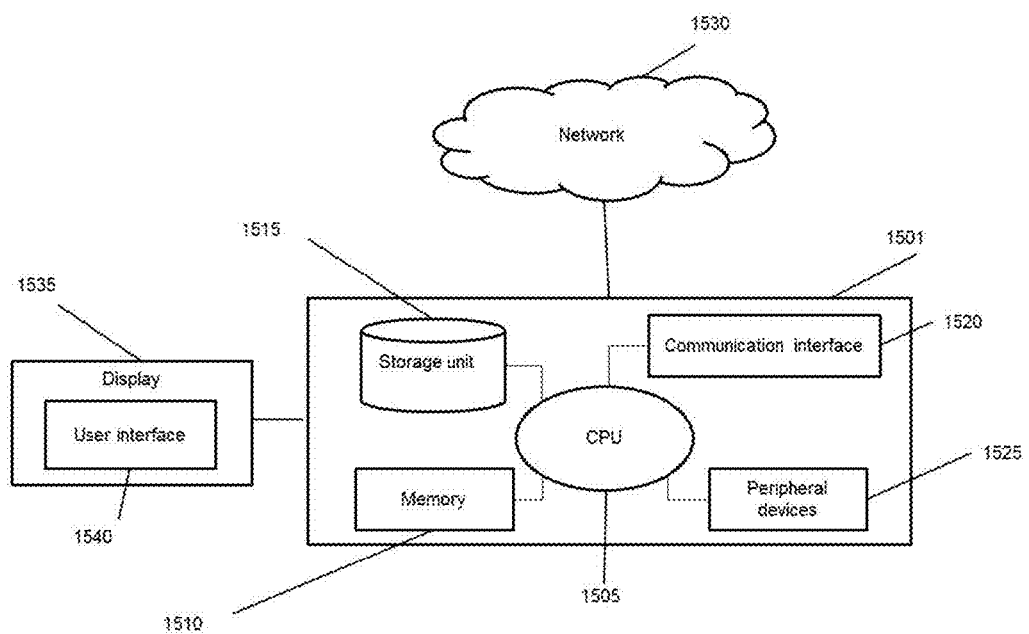
FIG. 15 shows a computer system that can be configured to implement any computing system disclosed in the present application.

FIG. 15 shows a computer system 1501 that can be configured to implement any computing system disclosed in the present application. The computer system 1501 can comprise a mobile phone, a tablet, a wearable device, a laptop computer, a desktop computer, a central server, etc.

The computer system 1501 includes a central processing unit (CPU, also "processor" and "computer processor" herein) 1505, which can be a single core or multi core processor, or a plurality of processors for parallel processing. The CPU can be the processor as described above. The computer system 1501 also includes memory or memory location 1510 (e.g., random-access memory, read-only memory, flash memory), electronic storage unit 1515 (e.g., hard disk), communication interface 1520 (e.g., network adapter) for communicating with one or more other systems, and peripheral devices 1525, such as cache, other memory, data storage and/or electronic display adapters. In some cases, the communication interface may allow the computer to be in communication with another device such as the imaging device or audio device. The computer may be able to receive input data from the coupled devices for analysis. The memory 1510, storage unit 1515, interface 1520 and peripheral devices 1525 are in communication with the CPU 1505 through a communication bus (solid lines), such as a motherboard. The storage unit 1515 can be a data storage unit (or data repository) for storing data. The computer system 1501 can be operatively coupled to a computer network ("network") 1530 with the aid of the communication interface 1520. The network 1530 can be the Internet, an internet and/or extranet, or an intranet and/or extranet that is in communication with the Internet. The network 1530 in some cases is a telecommunication and/or data network. The network 1530 can include one or more computer servers, which can enable distributed computing, such as cloud computing. The network 1530, in some cases with the aid of the computer system 1501, can implement a peer-to-peer network, which may enable devices coupled to the computer system 1501 to behave as a client or a server.

The CPU 1505 can execute a sequence of machine-readable instructions, which can be embodied in a program or software. The instructions may be stored in a memory location, such as the memory 1510. The instructions can be directed to the CPU 1505, which can subsequently program or otherwise configure the CPU 1505 to implement methods of the present disclosure. Examples of operations performed by the CPU 1505 can include fetch, decode, execute, and writeback.

The CPU 1505 can be part of a circuit, such as an integrated circuit. One or more other components of the system 1501 can be included in the circuit. In some cases, the circuit is an application specific integrated circuit (ASIC).

The storage unit 1515 can store files, such as drivers, libraries and saved programs. The storage unit 1515 can store user data, e.g., user preferences and user programs. The computer system 1501 in some cases can include one or more additional data storage units that are external to the computer system 1501, such as located on a remote server that is in communication with the computer system 1501 through an intranet or the Internet.

The computer system 1501 can communicate with one or more remote computer systems through the network 1530. For instance, the computer system 1501 can communicate with a remote computer system of a user. Examples of remote computer systems include personal computers, slate or tablet PC's, smart phones, personal digital assistants, and so on. The user can access the computer system 1501 via the network 1530.

Methods as described herein can be implemented by way of machine (e.g., computer processor) executable code stored on an electronic storage location of the computer system 1501, such as, for example, on the memory 1510 or electronic storage unit 1515. The machine executable or machine readable code can be provided in the form of software. During use, the code can be executed by the processor 1505. In some cases, the code can be retrieved from the storage unit 1515 and stored on the memory 1510 for ready access by the processor 1505. In some situations, the electronic storage unit 1515 can be precluded, and machine-executable instructions are stored on memory 1510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1501 can include or be in communication with an electronic display 1535 that comprises a user interface 1540 for providing, for example, a management interface. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1505.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:
1. A method of data management, comprising:
   (a) storing a plurality of items in a contiguous space within a main memory,
   (b) issuing an instruction to transmit the plurality of items from the main memory to a random-access memory (RAM) on a chip,
   wherein the instruction contains an address and a size that together identify the contiguous space, and
   wherein the chip includes a computing unit comprising a plurality of multipliers;

(c) issuing an instruction that allows the computing unit to obtain information regarding how the plurality of items are arranged in the contiguous space; and
(d) instructing the computing unit on the chip to:
retrieve multiple of the plurality of items from the RAM; and
perform a plurality of parallel operations using the plurality of multipliers with the multiple items to yield output data.

2. The method of claim 1, further comprising determining the address in the main memory and the size before storing the plurality of items into the contiguous space.

3. The method of claim 1,
wherein the plurality of items are classified into a plurality of groups, and
wherein the storing includes arranging items classified into one of the plurality of groups consecutively in the contiguous space.

4. The method of claim 3, further comprising
receiving information regarding a neural network,
wherein the plurality of groups corresponds to a plurality of layers of the neural network and the plurality of items include parameters of the neural network, and
where the plurality of parallel operations correspond to multiplications associated with one of the plurality of layers.

5. The method of claim 4, wherein the information regarding the neural network includes, for one of the plurality of layers, a combination of a number of filters, a number of channels, and a filter size.

6. A method of data management, comprising:
(a) storing a plurality of items in a contiguous space within a main memory, wherein the plurality of items is classified into a plurality of groups, and wherein items of the plurality of items classified into one of the plurality of groups are arranged consecutively in the contiguous space,
(b) issuing an instruction to transmit the plurality of items from the main memory to a random-access memory (RAM) on a chip, wherein the instruction contains an address and a size that together identify the contiguous space, and wherein the chip includes a computing unit comprising a plurality of multipliers;
(c) instructing the computing unit on the chip to:
retrieve multiple of the plurality of items from the RAM; and
perform a plurality of parallel operations using the plurality of multipliers with the multiple items to yield output data;
(d) receiving information regarding a neural network, wherein the information regarding the neural network includes, for one of a plurality of layers of the neural network, a combination of a number of filters, a number of channels, and a filter size, wherein the plurality of groups corresponds to the plurality of layers of the neural network and the plurality of items includes parameters of the neural network, and wherein the plurality of parallel operations corresponds to multiplications associated with one layer of the plurality of layers;
(e) for the one layer, determining a number of slices based on the number of channels or the filter size, wherein the contiguous space is divided into a plurality of contiguous regions; and
(f) dividing an area within one of the plurality of regions into at least the number of slices, each slice being contiguous,
wherein the storing includes arranging items classified into one of the plurality of groups across the number of slices such that all items stored at the same offset from starting points of the number of slices are used for the parallel operations.

7. A method of data management, comprising:
(a) storing a plurality of items in a contiguous space within a main memory, wherein the plurality of items are classified into a plurality of groups, wherein the items classified into one of the plurality of groups are arranged consecutively in the contiguous space, wherein the contiguous space is divided into a plurality of regions, each region being contiguous,
(b) arranging items classified into multiple of the plurality of groups in the same region to reduce unused space in the contiguous space,
(c) issuing an instruction containing an address and a size that together identify the contiguous space to transmit the plurality of items from the main memory to a random-access memory (RAM) on a chip, wherein the chip includes a computing unit comprising a plurality of multipliers; and
(d) instructing the computing unit on the chip to:
retrieve multiple of the plurality of items from the RAM; and
perform a plurality of parallel operations using the plurality of multipliers with the multiple items to yield output data.

8. The method of claim 7, further comprising receiving information regarding a neural network, wherein the plurality of groups corresponds to a plurality of layers of the neural network and the plurality of items include parameters of the neural network, and where the plurality of parallel operations correspond to multiplications associated with one of the plurality of layers.

9. The method of claim 8,
wherein a second contiguous space in the RAM having the substantially same size as the contiguous space in the main memory is divided into regions and slices in substantially the same manner as the contiguous space, and
wherein the plurality of items are arranged in the second contiguous space in substantially the same manner as in the contiguous space,
further comprising issuing an instruction that allows the computing unit to obtain, for one of the plurality of groups, information regarding a starting point of an area in the second contiguous space where items classified into the one group are stored and a starting point of at least one of a plurality of slices in the area.

10. A method of data management, comprising:
(a) storing a plurality of items in a contiguous space within a main memory, wherein the plurality of items are classified into a plurality of groups, and items classified into one of the plurality of groups are arranged consecutively in the contiguous space,
(b) dividing an area within one of a plurality of regions of the continuous space into a plurality of slices, each slice being contiguous, wherein the area is allocated to the items classified into the one group,
(c) arranging the items classified into the one group across the plurality of slices,
(d) issuing an instruction containing an address and a size that together identify the contiguous space to transmit the plurality of items from the main memory to a random-access memory (RAM) on a chip, wherein the chip includes a computing unit comprising a plurality of multipliers; and (e) instructing the computing unit on the chip to:
retrieve multiple of the plurality of items from the RAM; and
perform a plurality of parallel operations using the plurality of multipliers with the multiple items to yield output data, wherein the instructing includes performing multiple of the plurality of parallel operations using multiple items stored at the same offset from starting points of the plurality of slices.

11. A system for arranging data to accelerate deep computing, comprising:
one or more processors; and
one or more memories having instructions stored thereon which when executed by the one or more processors cause the one or more processors to perform:
(a) storing the plurality of items in a contiguous space within a main memory,
(b) issuing an instruction to transmit the plurality of items from the main memory to a random-access memory (RAM) on a chip,
wherein the instruction contains an address and a size that together identify the contiguous space, and
wherein the chip includes a computing unit comprising a plurality of multipliers;
(c) issuing an instruction that allows the computing unit to obtain information regarding how the plurality of items are arranged in the contiguous space; and
instructing the computing unit on the chip to:
retrieve multiple of the plurality of items from the RAM; and
perform a plurality of parallel operations using the plurality of multipliers with the multiple items to yield output data.

12. A system for arranging data to accelerate deep computing, comprising:
one or more processors; and
one or more memories having instructions stored thereon which when executed by the one or more processors cause the one or more processors to perform:
(a) storing the plurality of items in a contiguous space within a main memory,
(b) issuing an instruction to transmit the plurality of items from the main memory to a random-access memory (RAM) on a chip,
wherein the instruction contains an address and a size that together identify the contiguous space, and
wherein the chip includes a computing unit comprising a plurality of multipliers;
(c) issuing an instruction that allows the computing unit to obtain information regarding how the plurality of items are arranged in the contiguous space; and
instructing the computing unit on the chip to:
retrieve multiple of the plurality of items from the RAM; and perform a plurality of parallel operations using the plurality of multipliers with the multiple items to yield output data.

* * * * *

UNITED STATES PATENT AND TRADEMARK OFFICE
CERTIFICATE OF CORRECTION

PATENT NO. : 10,241,837 B2
APPLICATION NO. : 15/888380
DATED : March 26, 2019
INVENTOR(S) : Chang Huang et al.

It is certified that error appears in the above-identified patent and that said Letters Patent is hereby corrected as shown below:

In the Claims

Column 41, Line 13, Claim 11, please replace "A system for arranging data to accelerate deep computing, comprising:
one or more processors; and
one or more memories having instructions stored thereon which when executed by the one or more processors cause the one or more processors to perform:
(a) storing the plurality of items in a contiguous space within a main memory,
(b) issuing an instruction to transmit the plurality of items from the main memory to a random-access memory (RAM) on a chip,
wherein the instruction contains an address and a size that together identify the contiguous space, and wherein the chip includes a computing unit comprising a plurality of multipliers;
(c) issuing an instruction that allows the computing unit to obtain information regarding how the plurality of items are arranged in the contiguous space; and
instructing the computing unit on the chip to:
retrieve multiple of the plurality of items from the RAM; and
perform a plurality of parallel operations using the plurality of multipliers with the multiple items to yield output data." with --The method of claim 10, further comprising determining the address in the main memory and the size before storing the plurality of items into the contiguous space.--

Signed and Sealed this
Twenty-seventh Day of August, 2019

Andrei Iancu
*Director of the United States Patent and Trademark Office*